(12) United States Patent
Shi et al.

(10) Patent No.: US 11,689,026 B2
(45) Date of Patent: *Jun. 27, 2023

(54) PHOTOVOLTAIC POWER SYSTEM AND CONTROL METHOD THEREOF

(71) Applicant: Huawei Technologies Co., Ltd., Guangdong (CN)

(72) Inventors: Rongliang Shi, Shenzhen (CN); Kai Xin, Shanghai (CN); Yunfeng Liu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,413

(22) Filed: Apr. 7, 2022

(65) Prior Publication Data
US 2022/0231511 A1    Jul. 21, 2022

Related U.S. Application Data

(63) Continuation of application No. 17/247,379, filed on Dec. 9, 2020, now Pat. No. 11,316,347, which is a (Continued)

(30) Foreign Application Priority Data

Nov. 14, 2018    (CN) .......................... 201811354438.4

(51) Int. Cl.
*H02J 3/38* (2006.01)
*H02M 1/00* (2006.01)

(52) U.S. Cl.
CPC .............. *H02J 3/381* (2013.01); *H02M 1/00* (2013.01); *H02J 2300/26* (2020.01); *H02M 1/0009* (2021.05)

(58) Field of Classification Search
CPC .......... H02J 3/381; H02J 2300/26; H02J 3/48; H02M 1/00; H02M 1/0009; Y02E 10/56
(Continued)

(56) References Cited

U.S. PATENT DOCUMENTS

| 11,316,347 B2 * | 4/2022 | Shi .......................... H02J 3/381 |
| 2011/0196543 A1 | 8/2011 | Senosiain et al. |

(Continued)

FOREIGN PATENT DOCUMENTS

| CN | 103427429 A | 12/2013 |
| CN | 104079002 A | 10/2014 |

(Continued)

OTHER PUBLICATIONS

Miguel A. Torres L et al, "Self-Tuning Virtual Synchronous Machine: A Control Strategy for Energy Storage Systems to Support Dynamic Frequency Control", IEEE Transactions on Energy Conversion, vol. 29, No. 4, Dec. 2014, total 8 pages.
(Continued)

*Primary Examiner* — Richard Tan
(74) *Attorney, Agent, or Firm* — Womble Bond Dickinson (US) LLP

(57) ABSTRACT

A photovoltaic power system includes a DC/AC inverter circuit, N DC/DC converter circuits that are located at a previous stage of the DC/AC inverter circuit and that are respectively connected to photovoltaic strings, and a controller connected to the DC/AC inverter circuit and the N DC/DC converter circuits. The controller is configured to: perform MPPT control on n DC/DC converter circuits, and perform CPG control on (N−n) DC/DC converter circuits. In the two control manners, a fast and accurate power reserve or limit of a photovoltaic string inverter with any illumination intensity and ambient temperature can be implemented, and fluctuation of a DC bus voltage and AC output power of
(Continued)

the photovoltaic string inverter can be eliminated. Control on a virtual synchronous generator of the photovoltaic string inverter is implemented, and a lifespan of the photovoltaic string inverter is prolonged, without a need to add an energy storage element.

18 Claims, 17 Drawing Sheets

Related U.S. Application Data continuation of application No. PCT/CN2019/088343, filed on May 24, 2019.

(58) Field of Classification Search
USPC .......................................................... 307/137
See application file for complete search history.

(56) References Cited

U.S. PATENT DOCUMENTS

| | | |
|---|---|---|
| 2012/0161526 A1 | 6/2012 | Huang et al. |
| 2016/0254673 A1 | 9/2016 | Batten et al. |
| 2016/0372926 A1 | 12/2016 | Pahlevaninezhad et al. |
| 2020/0144934 A1 | 5/2020 | Chen et al. |

FOREIGN PATENT DOCUMENTS

| | | |
|---|---|---|
| CN | 105186554 A | 12/2015 |
| CN | 105406520 A | 3/2016 |
| CN | 105490320 A | 4/2016 |
| CN | 106208159 A | 12/2016 |
| CN | 106505602 A | 3/2017 |
| CN | 106708163 A | 5/2017 |
| CN | 106849179 A | 6/2017 |
| CN | 107134807 A | 9/2017 |
| CN | 107196341 A | 9/2017 |
| CN | 107591834 A | 1/2018 |
| CN | 107658899 A | 2/2018 |
| CN | 108183507 A | 6/2018 |
| CN | 108521140 A | 9/2018 |
| CN | 108599241 A | 9/2018 |
| JP | 2006074946 A | 3/2006 |

OTHER PUBLICATIONS

Cheng Zhijiang et al, Control Strategy for Hybrid Energy Storage of Photovoltaic Generation Microgrid System With Super Capacitor, Power System Technology, vol. 39 No. 10, Oct. 2015, with an English Abstract, total 7 pages.

Energinet. dk, Technical regulation 3.2.2 for PV power plants with a power output above 11 kW, Tech. Rep. Doc. 2015, total 111 pages.

Efstratios I. Batzelis et al, "Power Reserves Control for PV Systems With Real-Time MPP Estimation via Curve Fitting", IEEE Transactions on Sustainable Energy, vol. 8, No. 3, Jul. 2017, total 12 pages.

Eka Prasetyono et al, A Modified MPPT Algorithm Using Incremental Conductance for Constant Power Generation of Photovoltaic Systems, 2017 International Electronics Symposium on Engineering Technology and Applications (IES-ETA), total 6 pages.

German Federal Law, "Renewable Energy Sources Act (EEG 2017)", (Gesetz fur den Vorrang Erneuerbarer Energien), BGBl Std., Document No. BGBI. I S.1066, Jul. 2014, total 179 pages.

Rongliang Shi et al, "Self-tuning virtual synchronous generator control for improving frequency stability in autonomous photovoltaic-diesel microgrids", J. Mod. Power Syst. Clean Energy, 2017, total 13 pages.

Sangwongwanich et al, "A Sensorless Power Reserve Control Strategy for Two-Stage Grid-Connected PV Systems", IEEE Transactions on Power Electronics, vol. pp, No. 99, 2017, total 12 pages.

\* cited by examiner

PHOTOVOLTAIC POWER SYSTEM AND CONTROL METHOD THEREOF

CROSS-REFERENCE TO RELATED APPLICATIONS

This application is a continuation of U.S. patent application Ser. No. 17/247,379, filed on Dec. 9, 2020, which is a continuation of International Application No. PCT/CN2019/088343, filed on May 24, 2019. The International Application claims priority to Chinese Patent Application No. 201811354438.4, filed on Nov. 14, 2018. All of the aforementioned patent applications are hereby incorporated by reference in their entireties.

TECHNICAL FIELD

This application relates to the field of photovoltaic power generation technologies, and in particular, to a photovoltaic power system and a control method thereof.

BACKGROUND

A photovoltaic power system mainly includes a solar cell module, a controller, and an inverter. The photovoltaic power system constitutes an important part of national electricity supply. At present, a process of connecting the photovoltaic power system to a power grid is: connecting the photovoltaic power system to the power grid after a direct current generated by the solar cell module is converted by a grid-tie inverter into an alternating current satisfying a requirement. Compared with a central inverter, a photovoltaic string inverter features higher efficiency and better flexibility. Therefore, the photovoltaic string inverter is more frequently selected to connect the photovoltaic power system to the power grid.

In the prior art, a photovoltaic virtual synchronous generator (PV-VSG) uses a photovoltaic power unit control system to implement related functions such as inertia and voltage/reactive power adjustment, by retaining an active-power reserve or configuring an energy storage element. The energy storage element needs to be added to the photovoltaic string inverter. However, this increases costs of the photovoltaic power system and requires additional installation space. Therefore, currently, it is an important research focus to use an active-power reserve to control a PV-VSG without a need to add an energy storage element to a photovoltaic string inverter.

The active-power reserve is an important indicator of a photovoltaic power system. Precision of the active-power reserve is highly prone to impact of changes of external factors such as illumination intensity and ambient temperature. In the prior art, controlling a PV-VSG by using an active-power reserve of the photovoltaic power system is implemented mainly in either of two control manners: an active-power reserve based on variable power point tracking, or spinning reserve capacity tracking based on a maximum power point. The foregoing two control manners cannot avoid impact of a change of an external factor on the active-power reserve, and also quite easily cause fluctuation of a direct current bus voltage and alternating current output power that are of the photovoltaic string inverter. This is unfavorable to control on the virtual synchronous generator of the photovoltaic string inverter, and affects a lifespan of the photovoltaic string inverter.

SUMMARY

In view of this, embodiments of this application provide a photovoltaic power system and a control method thereof, to implement control on a virtual synchronous generator of a photovoltaic string inverter, and prolong a lifespan of the photovoltaic string inverter, without a need to add an energy storage element.

The embodiments of this application provide the following technical solutions.

A first aspect of the embodiments of this application provides a photovoltaic power system, including photovoltaic strings, a controller, a direct current-to-alternating current (DC/AC) inverter circuit, and N DC/DC converter circuits located at a previous stage of the DC/AC inverter circuit, where each DC/DC converter circuit is connected to at least one photovoltaic string, and a value of N is a positive integer greater than or equal to 2; the controller is connected to all of the DC/AC inverter circuit and the N DC/DC converter circuits, and is configured to: perform maximum power point tracking (MPPT) control on n DC/DC converter circuits, determine a first control parameter that enables the n DC/DC converter circuits to be in a maximum power point operating state, and control, based on the first control parameter and an active-power reserve parameter, (N−n) DC/DC converter circuits to operate in a constant power generation (CPG) mode, where a value of n is a positive integer greater than or equal to 1 and less than or equal to N−1; and the photovoltaic power system is connected to a power grid through an output end of the DC/AC inverter circuit.

According to an embodiment, the N DC/DC converter circuits located at the previous stage of the DC/AC inverter circuit are randomly divided into the n DC/DC converter circuits and the (N−n) DC/DC converter circuits, where MPPT control is performed on the n DC/DC converter circuits, and CPG control is performed on the (N−n) DC/DC converter circuits. The N DC/DC converter circuits located at the previous stage of the DC/AC inverter circuit are controlled in the two different control manners, to implement a fast and accurate power reserve or limit of a photovoltaic string inverter with any illumination intensity and ambient temperature, and eliminate fluctuation of a direct current bus voltage and alternating current output power that are of the photovoltaic string inverter, thereby prolonging a lifespan of the photovoltaic string inverter. This further implements control on a virtual synchronous generator of the photovoltaic string inverter without a need to add an energy storage element.

In a possible design, the controller includes an MPPT controller, configured to: perform MPPT control on the n DC/DC converter circuits; determine the first control parameter that enables the n DC/DC converter circuits to be in a maximum power point operating apparatus; and obtain a second control parameter based on the first control parameter and the active-power reserve parameter. The controller further includes a CPG controller, which may be configured to perform CPG control on the (N−n) DC/DC converter circuits based on the second control parameter, so that the (N−n) DC/DC converter circuits operate in the CPG mode.

According to an embodiment, the controller includes the MPPT controller and the CPG controller; the MPPT controller is configured to perform MPPT control on the n DC/DC converter circuits; and the obtained second control parameter is used as a reference for the CPG controller to perform CPG control on the (N−n) DC/DC converter circuits. Different control may be performed on the DC/DC converter circuits located at the previous stage of the DC/AC inverter circuit, to implement a fast and accurate power reserve or limit of the photovoltaic string inverter with any illumination intensity and ambient temperature, and eliminate fluctuation of a direct current bus voltage and alternating current output power that are of the photovoltaic string inverter, thereby prolonging a lifespan of the photovoltaic string inverter.

In an embodiment, the controller includes a VSG controller, configured to calculate a VSG power parameter based on a grid connection parameter for the power grid and a VSG control algorithm. The controller further includes an MPPT controller, configured to: perform MPPT control on the n DC/DC converter circuits; determine the first control parameter that enables the n DC/DC converter circuits to be in a maximum power point operating state; and obtain a second control parameter based on the first control parameter, the VSG power parameter, and the active-power reserve parameter. The controller further includes a CPG controller, configured to perform CPG control on the (N−n) DC/DC converter circuits based on the second control parameter, so that the (N−n) DC/DC converter circuits operate in the CPG mode.

It should be noted that the VSG controller is configured to calculate the VSG power parameter based on an actually detected current power grid frequency, a rated power grid frequency, and any virtual inertia of a constant virtual inertia, an adaptive zero virtual inertia, and an adaptive negative virtual inertia by using the VSG control algorithm, where the constant virtual inertia is a constant virtual inertia time constant in the VSG control algorithm, the adaptive zero virtual inertia is an adaptive zero virtual inertia time constant in the VSG control algorithm, and the adaptive negative virtual inertia is an adaptive negative virtual inertia time constant in the VSG control algorithm.

According to an embodiment, the controller includes the MPPT controller and the CPG controller; the MPPT controller is configured to perform MPPT control on the n DC/DC converter circuits; and the obtained second control parameter is used as a reference for the constant power generation CPG controller to perform CPG control on the (N−n) DC/DC converter circuits. In this way, control on the photovoltaic string inverter is implemented.

It should be noted that based on the foregoing possible designs, the MPPT controller may be constituted in a plurality of structures. In an embodiment, the MPPT controller includes n control circuits, a first arithmetic unit, and a second arithmetic unit, or alternatively, the MPPT controller includes n control circuits, a first arithmetic unit, and a third arithmetic unit, where each control circuit includes an MPPT processing unit and a multiplier. In an embodiment, the MPPT controller includes n MPPT processing units, a first arithmetic unit, and a fourth arithmetic unit. By using the plurality of structures disclosed in this embodiment of this application, the MPPT controller performs MPPT control on the n DC/DC converter circuits; determines the first control parameter that enables the n DC/DC converter circuits to be in a maximum power point operating apparatus; and obtains the second control parameter based on the first control parameter and the active-power reserve parameter. For a specific implementation process, refer to related descriptions in this specification.

A second aspect of the embodiments of this application provides a photovoltaic power system control method, which is applicable to the photovoltaic power system provided in the first aspect of the embodiments of this application. The control method includes:

performing MPPT control on n DC/DC converter circuits, and determining a first control parameter that enables the n DC/DC converter circuits to be in a maximum power point operating state, where a value of n is a positive integer greater than or equal to 1 and less than or equal to N−1; and controlling, based on the first control parameter and an active-power reserve parameter, (N−n) DC/DC converter circuits to operate in a constant power generation CPG mode.

According to the solution, N DC/DC converter circuits are controlled in the two different control manners, to implement a fast and accurate power reserve or limit of a photovoltaic string inverter with any illumination intensity and ambient temperature, and eliminate fluctuation of a direct current bus voltage and alternating current output power that are of the photovoltaic string inverter. In addition, control on a virtual synchronous generator of the photovoltaic string inverter is implemented, and a lifespan of the photovoltaic string inverter is prolonged, without a need to add an energy storage element. This further implements control on the virtual synchronous generator of the photovoltaic string inverter without a need to add the energy storage element.

In an embodiment, the controlling, based on the first control parameter and an active-power reserve parameter, (N−n) DC/DC converter circuits to operate in a CPG mode includes:

obtaining a second control parameter based on the first control parameter and the active-power reserve parameter; and controlling, based on the second control parameter, the (N−n) DC/DC converter circuits to operate in the CPG mode.

In an embodiment, the controlling, based on the first control parameter and an active-power reserve parameter, (N−n) DC/DC converter circuits to operate in the CPG mode includes: obtaining a VSG power parameter based on a grid connection parameter for a power grid and a VSG control algorithm; obtaining a second control parameter based on the first control parameter, the VSG power parameter, and the active-power reserve parameter; and controlling, based on the second control parameter, the (N−n) DC/DC converter circuits to operate in the CPG mode.

In an embodiment, the obtaining a VSG power parameter based on a grid connection parameter for a power grid and a VSG control algorithm includes:

calculating the VSG power parameter based on an actually detected current power grid frequency, a rated power grid frequency, and any one of a constant virtual inertia, an adaptive zero virtual inertia, and an adaptive negative virtual inertia by using the VSG control algorithm, where the constant virtual inertia is a constant virtual inertia time constant in the VSG control algorithm, the adaptive zero virtual inertia is an adaptive zero virtual inertia time constant in the VSG control algorithm, and the adaptive negative virtual inertia is an adaptive negative virtual inertia time constant in the VSG control algorithm.

A third aspect of the embodiments of this application provides a controller, including a memory and a processor that communicates with the memory, where the memory is configured to store program code for controlling a photovoltaic string inverter; and the processor is configured to invoke the program code, in the memory, for controlling the photovoltaic string inverter, to perform a photovoltaic string inverter control method provided in the second aspect of the embodiments of this application.

A fourth aspect of the embodiments of this application provides a nonvolatile computer-readable storage medium, configured to store a computer program, where the computer program includes an instruction used to perform the method in any possible design of the second aspect of the embodiments of this application.

DESCRIPTION OF EMBODIMENTS

The following describes the technical solutions in the embodiments of this application with reference to the accompanying drawings in the embodiments of this application. In description of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two. In addition, for clear description of the technical solutions of the embodiments of this application, in the embodiments of this application, terms such as "first" and "second" are used to distinguish between same or similar objects having a basically same function and effect. A person skilled in the art can understand that the terms such as "first" and "second" are not used to limit a quantity and an execution sequence, and that the terms such as "first" and "second" are unnecessarily limited to be different.

Moreover, terms "include" and "have" in the embodiments of this application, the claims, and the accompanying drawings are inclusive. For example, a process, a method, a system, a product, or a device including a series of operations or units is not limited to the listed operations or units, and may further include operations or units that are not listed.

A photovoltaic power system is a power generation system including devices such as photovoltaic modules, an inverter, a cable, and a transformer, and can convert solar energy into usable electrical energy and output the electrical energy to a power grid or an off-grid system.

The photovoltaic modules are direct current power supplies formed after solar cells are connected in series and in parallel and then are packaged.

In the embodiments of this application, the inverter is a photovoltaic string inverter. A direct current side of the photovoltaic string inverter may be connected to a plurality of photovoltaic strings that are not in a parallel connection. The photovoltaic string inverter may use two levels of power conversion: conversion from a direct current to a direct current and conversion from a direct current to an alternating current.

A photovoltaic string is a direct current power supply formed through end-to-end series connection of positive and negative electrodes of a plurality of photovoltaic modules.

Figure 1:
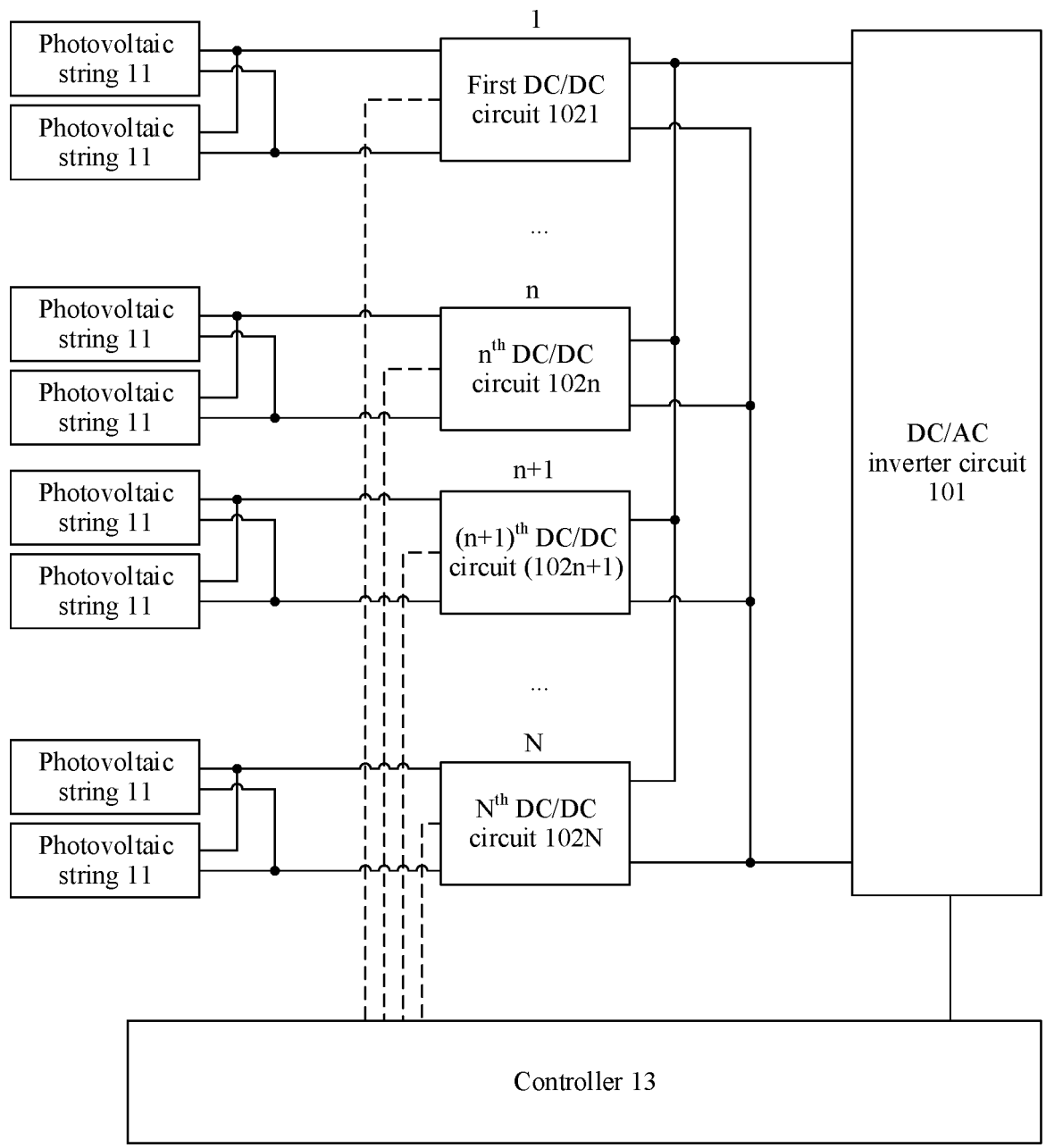
FIG. 1 is a schematic structural diagram of a photovoltaic power system according to an embodiment of this application.

FIG. 1 is a schematic structural diagram of a photovoltaic power system according to an embodiment of this application. The photovoltaic power system includes a photovoltaic string inverter, photovoltaic strings 11, and a controller 12. The photovoltaic string inverter mainly includes a DC/AC inverter circuit 101 and a total of N DC/DC converter circuits, that is, a DC/DC converter circuit 1021 to a DC/DC converter circuit 102N. A value of N is a positive integer greater than or equal to 2, that is, N≥2.

The N DC/DC converter circuits are located at a previous stage of the DC/AC inverter circuit 101. Each DC/DC converter circuit is connected to at least one photovoltaic string 11.

In an embodiment, a connection relationship between a DC/DC converter circuit and a photovoltaic string is as follows:

A positive electrode of an input port of each DC/DC converter circuit is connected to a positive electrode of a photovoltaic string that is in a same group as the DC/DC converter circuit, and a negative electrode of the input port of the DC/DC converter circuit is connected to a negative electrode of the photovoltaic string that is in the same group as the DC/DC converter circuit.

Each DC/DC converter circuit and a photovoltaic string connected to the DC/DC converter circuit are considered as being in a same group. Photovoltaic strings in a same group are in a parallel connection relationship.

In an embodiment, a connection relationship between the DC/AC inverter circuit 101 and the N DC/DC converter circuits that are located at the previous stage of the DC/AC inverter circuit 101 is as follows:

A positive electrode of an output port of each DC/DC converter circuit is connected in parallel to a positive electrode of an input port on a direct current side of the DC/AC inverter circuit 101, and a negative electrode of the output port of the DC/DC converter circuit is connected in parallel to a negative electrode of the input port on the direct current side of the DC/AC inverter circuit 101.

It should be noted that the string inverter may be applied to photovoltaic power generation scenarios, such as an application scenario of a large-sized photovoltaic station, application scenarios of small and medium-sized distributed power stations, and an application scenario of a residential photovoltaic power system.

An alternating current cable outlet terminal of the DC/AC inverter circuit 101 is used as an output port of the string inverter, and is connected to a power grid through a cable. Specifically, the alternating current cable outlet terminal may be connected to a transformer, or may directly be connected to a single-phase or three-phase alternating current power grid.

The controller 13 is connected to the DC/AC inverter circuit 101 and the N DC/DC converter circuits.

In an embodiment of this application, the controller 13 is configured to: perform maximum power point tracking (MPPT) control on n DC/DC converter circuits, determine a first control parameter that enables the n DC/DC converter circuits to be in a maximum power point operating state, and control, based on the first control parameter and an active-power reserve parameter, (N−n) DC/DC converter circuits to operate in a constant power generation (CPG) mode, where a value of n is a positive integer greater than or equal to 1 and less than or equal to N−1, that is, 1≤n≤N−1.

In an embodiment, the N DC/DC converter circuits are randomly divided into the n DC/DC converter circuits and the (N−n) DC/DC converter circuits in advance, provided that N≥2 and 1≤n≤N−1 are satisfied.

In an embodiment, the controller 13 is further configured to: collect parameters such as an input voltage and an input current that are of each DC/DC converter circuit, a direct current bus voltage, and an alternating current power grid voltage and an alternating current output current that are of the DC/AC inverter circuit in real time; provide a pulse-width modulation (PWM) control signal of each DC/DC converter circuit in real time according to a control policy of the DC/DC converter circuit; and provide a PWM control signal of the DC/AC inverter circuit in real time according to a control policy of the DC/AC inverter circuit.

In the photovoltaic power system disclosed in an embodiment of this application, master control is performed on the n DC/DC converter circuits in the N DC/DC converter circuits located at the previous stage of the DC/AC inverter circuit, that is, MPPT control is performed, so that the n DC/DC converter circuits operate in an MPPT mode; and slave control is performed on the (N−n) DC/DC converter circuits, that is, CPG control is performed, so that the (N−n) DC/DC converter circuits operate in a CPG mode. In this embodiment of this application, master-slave control is implemented on the N DC/DC converter circuits located at the previous stage of the DC/AC inverter circuit, to reduce impact of illumination intensity and ambient temperature on an active-power reserve of the photovoltaic string inverter, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

In the photovoltaic power system shown in FIG. 1, there may be a plurality of control manners in which the controller 13 performs MPPT control on the n DC/DC converter circuits in the N DC/DC converter circuits and performs CPG control on the (N−n) DC/DC converter circuits in the N DC/DC converter circuits. This embodiment of this application provides detailed descriptions by using the following embodiments.

Figure 2:
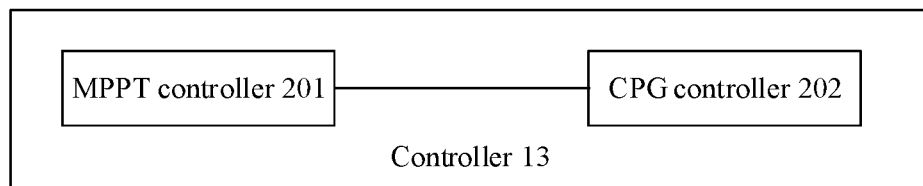
FIG. 2 is a schematic structural diagram of a controller according to an embodiment of this application.

FIG. 2 is a schematic structural diagram of a controller 13 according to an embodiment of this application. The controller 13 includes an MPPT controller 201 and a CPG controller 202.

The MPPT controller 201 is configured to: perform MPPT control on n DC/DC converter circuits; determine a first control parameter that enables the n DC/DC converter circuits to be in a maximum power point operating apparatus; and obtain a second control parameter based on the first control parameter and an active-power reserve parameter.

The n DC/DC converter circuits are master-controlled DC/DC converter circuits.

The CPG controller 202 is configured to perform CPG control on (N−n) DC/DC converter circuits based on the second control parameter, so that the (N−n) DC/DC converter circuits operate in a constant power generation CPG mode.

The (N−n) DC/DC converter circuits are slave-controlled DC/DC converter circuits.

In specific implementation, there are a plurality of manners in which the MPPT controller 201 performs MPPT control on the n DC/DC converter circuits.

Figure 3:
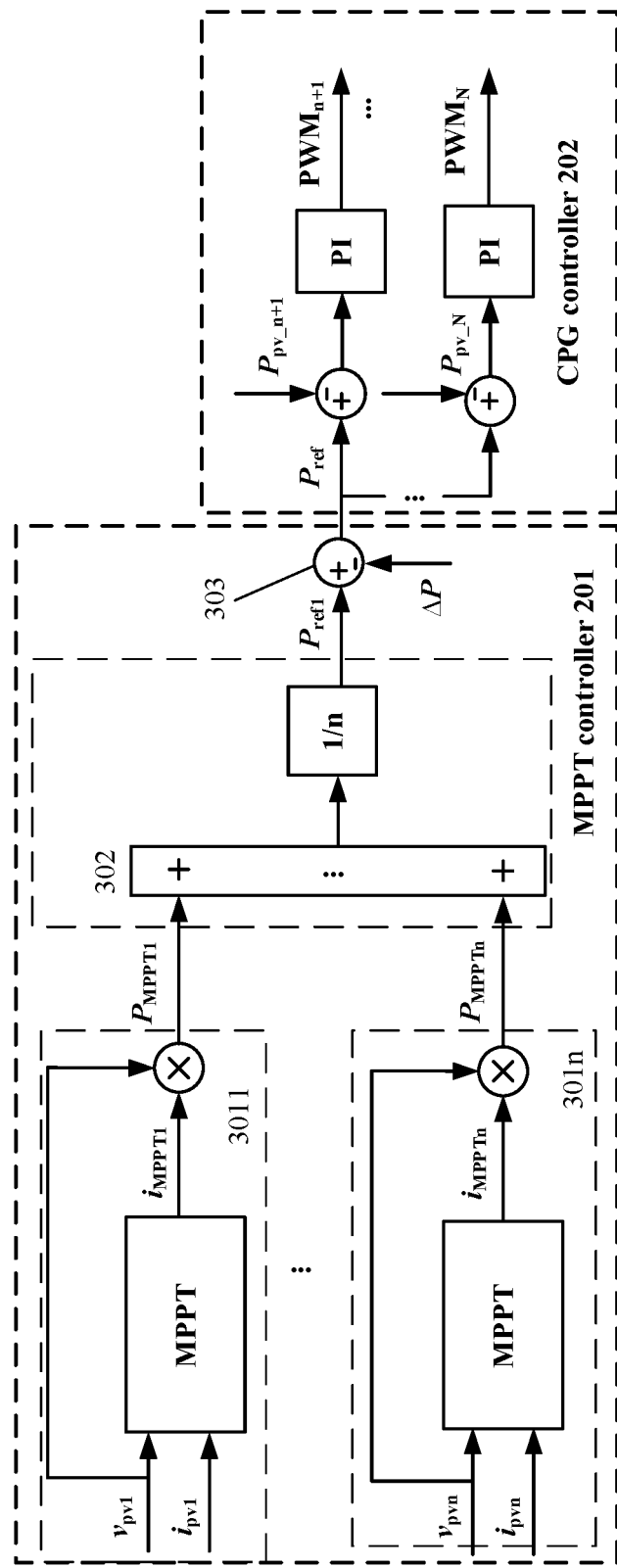
FIG. 3 is a schematic diagram of an execution principle of executing an MPPT control algorithm by an MPPT controller according to an embodiment of this application.

FIG. 3 is a schematic diagram of an execution principle of executing an MPPT control algorithm by an MPPT controller according to an embodiment of this application. The MPPT controller 201 includes a total of n control circuits, that is, a control circuit 3011 to a control circuit 301n, a first arithmetic unit 302, and a second arithmetic unit 303.

Each control circuit includes an MPPT processing unit and a multiplier.

The MPPT processing unit is configured to: detect a first input voltage and a first input current of a corresponding DC/DC converter circuit; determine current input power of the corresponding DC/DC converter circuit based on the first input voltage and the first input current; and obtain a second input current at a maximum power point of the DC/DC converter circuit by using an MPPT control algorithm.

The multiplier is connected to the maximum power point tracking MPPT processing unit, and is configured to calculate a product of the first input voltage and the second input current to obtain a maximum output active-power parameter.

The first arithmetic unit 302 connected to the n control circuits is configured to: determine a maximum output active-power parameter output by each control circuit; perform summation and averaging operations on n maximum output active-power parameters; and use an obtained maximum output active-power average value as a first control parameter.

The second arithmetic unit 303 is configured to: determine a power parameter based on an active-power reserve parameter and the first control parameter; and use the power parameter as a second control parameter.

Correspondingly, a CPG controller is configured to control, based on the second control parameter, (N−n) DC/DC converter circuits to operate in a power adjustment-based constant power generation CPG mode.

The first control circuit and the $n^{th}$ control circuit shown in FIG. 3 are used as an example for description, and a same processing manner is also applied to other middle control circuits.

For the first control circuit, the MPPT processing unit is configured to: detect a first input voltage $v_{pv1}$ and a first input current $i_{pv1}$ of a first master-controlled DC/DC converter, and obtain an input current $i_{MPPT1}$ at a maximum power point through MPPT control; and the multiplier is configured to perform a multiplication operation on the first input voltage $v_{pv1}$ of the first master-controlled DC/DC converter and the second input current $i_{MPPT1}$ at the maximum power point, to obtain a maximum output active-power parameter $P_{MPPT1}$.

For the $n^{th}$ control circuit, the MPPT processing unit is configured to: detect a first input voltage $v_{pvn}$ and a first input current $i_{pvn}$ of the first master-controlled DC/DC converter, and obtain an input current $i_{MPPTn}$ at a maximum power point through MPPT control; and the multiplier is configured to perform a multiplication operation on the first input voltage $v_{pvn}$ of the first master-controlled DC/DC converter and the second input current $i_{MPPTn}$ at the maximum power point, to obtain a maximum output active-power parameter $P_{MPPTn}$.

The first arithmetic unit 302 is configured to: perform summation on obtained maximum output active-power parameters $P_{(MPPT1\text{-}MPPTn)}$ of n master-controlled DC/DC converters; perform an averaging operation on a value obtained through summation; and use an obtained maximum output active-power average value as an active-power reference parameter $P_{ref1}$ of (N−n) slave-controlled DC/DC converters.

The second arithmetic unit 303 is configured to: calculate the active-power reference parameter $P_{ref1}$ and an active-power reserve parameter $\Delta P$ according to formula (1); and use an obtained power parameter as a second control parameter $P_{ref}$ where $$P_{ref} = P_{ref1} - \Delta P \qquad (1)$$

The active-power reserve parameter $\Delta P$ is an active-power reserve/limit parameter $\Delta P$.

The power parameter $P_{ref}$ calculated according to formula (1) is used as a power parameter for CPG control on the (N−n) DC/DC converter circuits.

Correspondingly, the CPG controller 202 shown in FIG. 2 is configured to control, based on the power parameter $P_{ref}$ for CPG control obtained by the MPPT processing unit, the (N−n) DC/DC converter circuits to operate in a power adjustment-based CPG (P-CPG) mode, to obtain a PWM signal corresponding to each DC/DC converter circuit.

The PWM control signal is used as a modulation signal for driving an action of a switching transistor.

In an embodiment, the CPG controller 202 compares the obtained power parameter $P_{ref}$ with output active-power $P_{pv\_m}$ of an $m^{th}$ slave-controlled DC/DC converter, and a proportional integral PI controller obtains a PWM control signal of the $m^{th}$ slave-controlled DC/DC converter based on an obtained power comparison result, where m=n+1, n+2, ..., N.

It should be noted that, a control manner in which the (N−n) DC/DC converter circuits are controlled to operate in a power adjustment-based CPG (P-CPG) mode may be a power control manner such as proportional integral control, direct power control, and model prediction control. Details are not described in this embodiment of this application.

A photovoltaic string inverter disclosed in this embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

Figure 4:
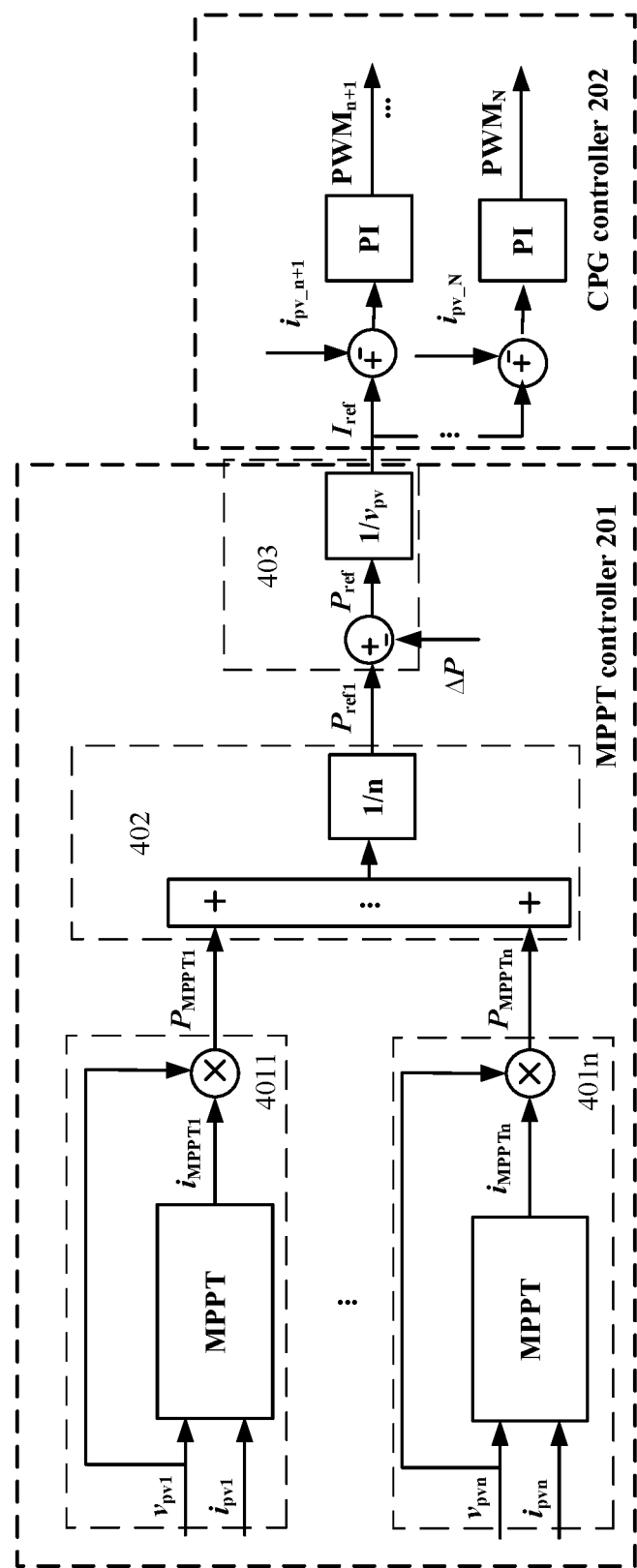
FIG. 4 is a schematic diagram of another execution principle of executing an MPPT control algorithm by an MPPT controller according to an embodiment of this application.

FIG. 4 is a schematic diagram of another execution principle of executing an MPPT control algorithm by an MPPT controller 201 according to an embodiment of this application. The MPPT controller 201 includes a total of n control circuits, that is, a control circuit 4011 to a control circuit 401n, a first arithmetic unit 402, and a third arithmetic unit 403.

Each control circuit includes an MPPT processing unit and a multiplier.

The MPPT processing unit is configured to: detect a first input voltage and a first input current of a corresponding DC/DC converter circuit; determine current input power of the corresponding DC/DC converter circuit based on the first input voltage and the first input current; and obtain a second input current at a maximum power point of the DC/DC converter circuit by using an MPPT control algorithm.

The second input current at the maximum power point is obtained based on the MPPT control algorithm.

The multiplier is connected to the MPPT processing unit, and is configured to calculate a product of the first input voltage and the second input current to obtain a maximum output active-power parameter.

The first arithmetic unit 402 connected to the n control circuits is configured to determine, as a first control parameter, an average value of maximum output active-power output by the control circuits.

The third arithmetic unit 403 is configured to: determine a current parameter based on an active-power reserve parameter and the first control parameter; and use the current parameter as a second control parameter.

Correspondingly, a CPG controller is configured to control, based on the second control parameter, (N−n) DC/DC converter circuits to operate in a current adjustment-based constant power generation CPG mode.

The first control circuit and the $n^{th}$ control circuit shown in FIG. 4 are used as an example for description, and a same processing manner is also applied to other middle control circuits.

For the first control circuit, the MPPT processing unit is configured to: detect a first input voltage $v_{pv1}$ and a first input current $i_{pv1}$ of a first master-controlled DC/DC converter, and obtain an input current $i_{MPPT1}$ at a maximum power point through MPPT control; and the multiplier is configured to perform a multiplication operation on the first input voltage $v_{pv1}$ of the first master-controlled DC/DC converter and the second input current $i_{MPPT1}$ at the maximum power point, to obtain maximum output active-power $P_{MPPT1}$.

For the $n^{th}$ control circuit, the MPPT processing unit is configured to: detect a first input voltage $v_{pvn}$ and a first input current $i_{pvn}$ of the first master-controlled DC/DC converter, and obtain an input current $i_{MPPTn}$ at a maximum power point through MPPT control; and the multiplier is configured to perform a multiplication operation on the first input voltage $v_{pvn}$ of the first master-controlled DC/DC converter and the second input current $i_{MPPTn}$ at the maximum power point, to obtain a maximum output active-power parameter $P_{MPPTn}$.

The first arithmetic unit 402 is configured to: perform summation on obtained maximum output active-power parameters $P_{(MPPT1-MPPTn)}$ of n master-controlled DC/DC converters; perform an averaging operation on a value obtained through summation; and use an obtained maximum output active-power average value as an active-power reference $P_{ref1}$ of (N−n) slave-controlled DC/DC converters.

The third arithmetic unit 403 is configured to: calculate the active-power reference $P_{ref1}$ and an active-power reserve parameter ΔP according to formula (1), to obtain a power parameter $P_{ref}$; process the power parameter $P_{ref}$ according to formula (2); and use an obtained current parameter $I_{ref}$ as a second control parameter, where $$I_{ref}=P_{ref}/v_{pv} \quad (2)$$

$v_{pv}$ is an input voltage of a slave-controlled DC/DC converter, that is, a direct-current voltage of a photovoltaic string.

The current parameter $I_{ref}$ calculated according to formula (2) is used as a current instruction for CPG control on the (N−n) DC/DC converter circuits.

Correspondingly, the CPG controller 202 shown in FIG. 2 is configured to control, based on the current instruction $I_{ref}$ for CPG control obtained by the MPPT processing unit, the (N−n) DC/DC converter circuits to operate in a current adjustment-based CPG (I-CPG) mode, to obtain a PWM signal corresponding to each DC/DC converter circuit.

The PWM control signal is used as a modulation signal for driving an action of a switching transistor.

In an embodiment, the CPG controller 202 compares the obtained current instruction $I_{ref}$ with an input current $I_{pv\_m}$ of an $m^{th}$ slave-controlled DC/DC converter, and a proportional integral PI controller obtains a PWM control signal of the $m^{th}$ slave-controlled DC/DC converter based on an obtained current comparison result, where m=n+1, n+2, ..., N.

It should be noted that, a control manner in which the (N−n) DC/DC converter circuits are controlled to operate in a power adjustment-based CPG (I-CPG) mode may be a power control manner such as proportional integral control, direct power control, and model prediction control. Details are not described in this embodiment of this application.

A photovoltaic string inverter disclosed in an embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

Figure 5:
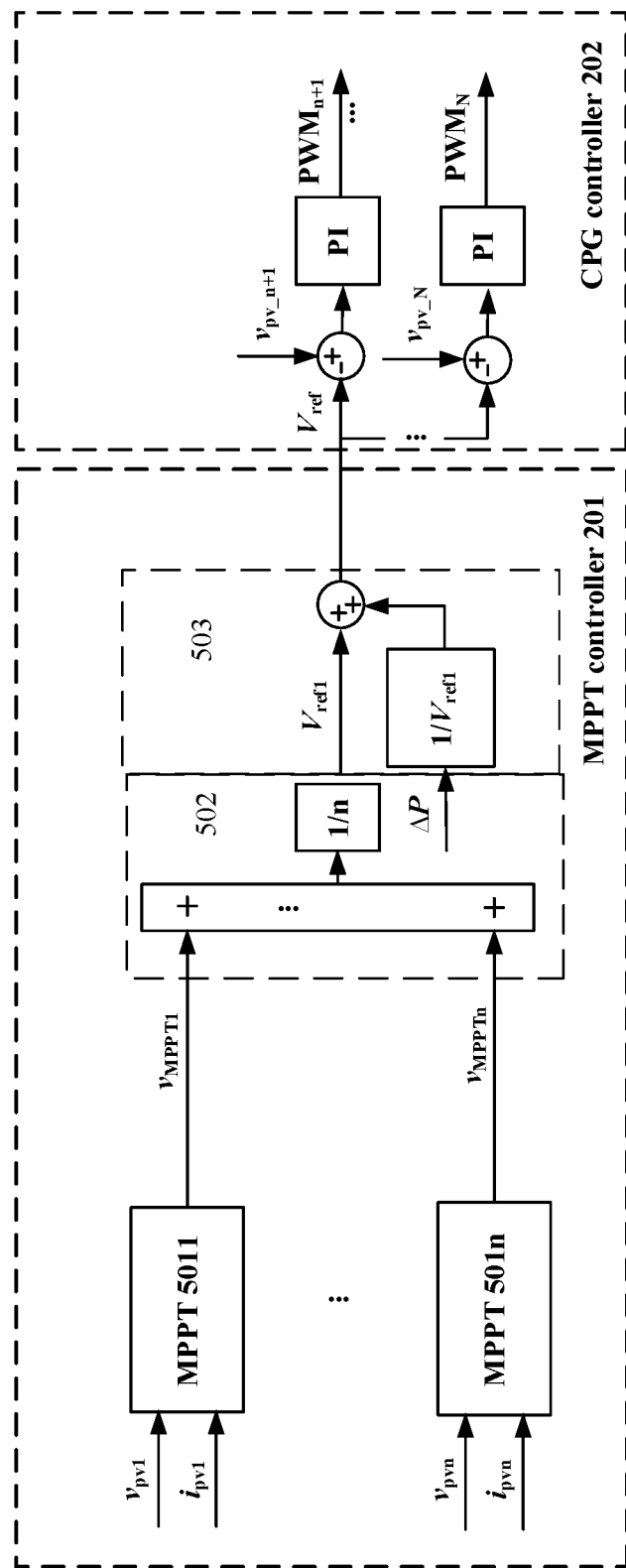
FIG. 5 is a schematic diagram of another execution principle of executing an MPPT control algorithm by an MPPT controller according to an embodiment of this application.

FIG. 5 is a schematic diagram of another execution principle of executing an MPPT control algorithm by an MPPT controller according to an embodiment of this application. The MPPT controller 201 includes a total of n MPPT processing units, that is, an MPPT processing unit 5011 to an MPPT processing unit 501n, a first arithmetic unit 502, and a fourth arithmetic unit 503.

Each MPPT processing unit is configured to: detect a first input voltage and a first input current of a corresponding DC/DC converter circuit; determine current input power of the corresponding DC/DC converter circuit based on the first input voltage and the first input current; and obtain a second input voltage at a maximum power point of the DC/DC converter circuit by using a maximum power point tracking MPPT control algorithm.

The first arithmetic unit 502 connected to the n MPPT processing units is configured to determine a second input voltage output by each MPPT processing unit; perform summation and averaging operations on n second input voltages; and use an obtained second input voltage average value as a first control parameter.

The fourth arithmetic unit 503 is configured to: perform calculation based on an active-power reserve parameter and the first control parameter; and use an obtained voltage parameter as a second control parameter.

Correspondingly, a CPG controller is configured to control, based on the second control parameter, (N−n) DC/DC converter circuits to operate in a voltage adjustment-based constant power generation CPG mode.

The MPPT processing unit 5011 and the MPPT processing unit 501n shown in FIG. 5 are used as an example for description, and a same processing manner is also applied to other MPPT processing units.

For the MPPT processing unit 5011, the MPPT processing unit 5011 is configured to: detect a first input voltage $v_{pv1}$ and a first input current $i_{pv1}$ of a first master-controlled DC/DC converter, and obtain an input voltage $v_{MPPT1}$ at a maximum power point through MPPT control.

For the MPPT processing unit 501n, the MPPT processing unit 501n is configured to: detect a first input voltage $v_{pvn}$ and a first input current $i_{pvn}$ of an $n^{th}$ master-controlled DC/DC converter, and obtain an input voltage $v_{MPPTn}$ at a maximum power point through MPPT control.

The first arithmetic unit 502 is configured to: perform summation on obtained input voltages $I_{(MPPT1\text{-}MPPTn)}$ of n master-controlled DC/DC converters; perform an averaging operation on a value obtained through summation; and use an obtained input voltage average value as a voltage reference $V_{ref1}$ of (N−n) slave-controlled DC/DC converters.

The fourth arithmetic unit 503 is configured to: process an active-power reserve parameter ΔP and the voltage reference $V_{ref1}$ according to formula (3); and use an obtained voltage parameter $V_{ref}$ as a second control parameter, where $$V_{ref} = V_{ref1} + \Delta P / V_{ref1} \tag{3}$$

The voltage parameter $V_{ref}$ calculated according to formula (3) is used as a voltage instruction for CPG control on the (N−n) DC/DC converter circuits.

Correspondingly, the CPG controller 202 shown in FIG. 2 is configured to control, based on the voltage parameter $V_{ref}$ for CPG control obtained by the MPPT processing unit, the (N−n) DC/DC converter circuits to operate in a voltage adjustment-based CPG (V-CPG) mode, to obtain a PWM signal corresponding to each DC/DC converter circuit.

The PWM control signal is used as a modulation signal for driving an action of a switching transistor.

In an embodiment, the CPG controller 202 compares the obtained voltage parameter $V_{ref}$ with an input current $v_{pv\_m}$ of an $m^{th}$ slave-controlled DC/DC converter, and a proportional integral PI controller obtains a $PWM_m$ control signal of the $m^{th}$ slave-controlled DC/DC converter based on an obtained voltage comparison result, where m=n+1, n+2, . . . , N.

A photovoltaic string inverter disclosed in an embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

As disclosed in an embodiment of this application, master MPPT control is performed on the n DC/DC converter circuits in the N DC/DC converter circuits located at the previous stage of the DC/AC inverter circuit, and slave CPG control is performed on the (N−n) DC/DC converter circuits. In this way, based on master-slave control on the N DC/DC converters located at the previous stage of the DC/AC inverter circuit, PV-VSG control by using an active-power reserve can be implemented; problems of deterioration in PV-VSG output performance and even system instability that are caused by illumination intensity and ambient temperature changes can be resolved; and an inertia support capability of a photovoltaic power system can be enhanced, and fluctuation of the direct current bus voltage and the output power that are of the string inverter in the power control process can be eliminated.

Based on the photovoltaic string inverter shown in FIG. 1 in the foregoing embodiment of this application, in the process in which PV-VSG control by using the active-power reserve is implemented based on master-slave control on the N DC/DC converters located at the previous stage of the DC/AC inverter circuit, there may be a plurality of control manners in which a controller 103 performs MPPT control on the n DC/DC converter circuits in the N DC/DC converter circuits and performs CPG control on the (N−n) DC/DC converter circuits in the N DC/DC converter circuits. This embodiment of this application provides detailed descriptions by using the following embodiments.

Figure 6:
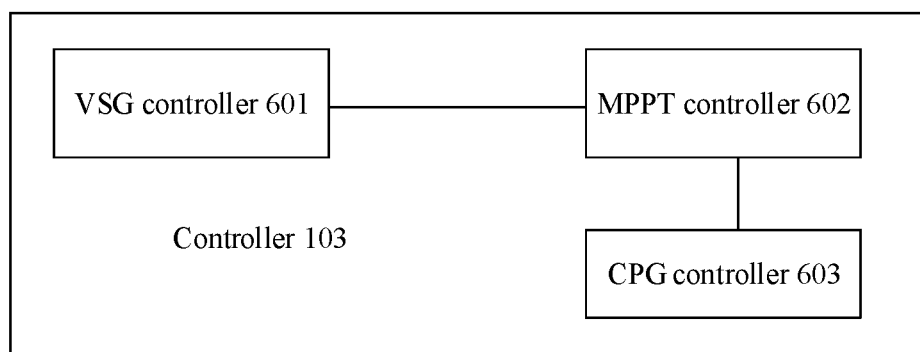
FIG. 6 is a schematic structural diagram of another controller according to an embodiment of this application.

FIG. 6 is a schematic structural diagram of another controller 13 according to an embodiment of this application. The controller 13 includes a VSG controller 601, an MPPT controller 602, and a CPG controller 603.

The VSG controller 601 is configured to calculate a VSG power parameter based on a grid connection parameter for a power grid and a VSG control algorithm.

The MPPT controller 602 is configured to: perform MPPT control on n DC/DC converter circuits; determine a first control parameter that enables the n DC/DC converter circuits to be in a maximum power point operating state; and obtain a second control parameter based on the first control parameter, the VSG power parameter, and an active-power reserve parameter.

The n DC/DC converter circuits are master-controlled DC/DC converter circuits.

The CPG controller 603 is configured to perform CPG control on (N−n) DC/DC converter circuits based on the second control parameter, so that the (N−n) DC/DC converter circuits operate in a constant power generation CPG mode.

The (N−n) DC/DC converter circuits are slave-controlled DC/DC converter circuits.

In an embodiment, there are a plurality of manners in which the VSG controller 601 obtains the VSG power parameter based on the power grid parameter and the VSG control algorithm.

Figure 7:
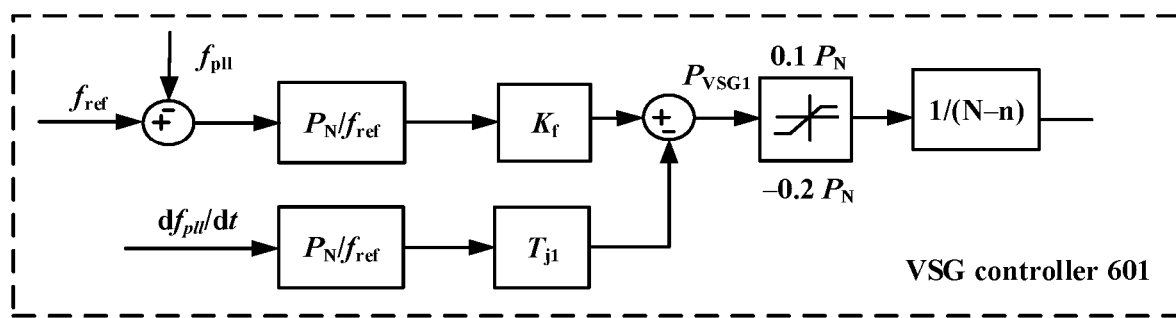
FIG. 7 is a schematic diagram of an execution principle of executing a VSG control algorithm by a VSG controller according to an embodiment of this application.

FIG. 7 is a schematic diagram of an execution principle of executing a VSG control algorithm by a VSG controller according to an embodiment of this application.

The VSG controller 601 is configured to calculate a VSG power parameter based on an actually detected current power grid frequency, a rated power grid frequency, and a constant virtual inertia by using the virtual synchronous generator VSG control algorithm.

The constant virtual inertia is a constant virtual inertia time constant in the VSG control algorithm.

In an embodiment, the VSG controller 601 performs VSG control calculation according to formula (4) based on the power grid frequency $f_{pll}$ actually detected by a phase-locked loop, the rated power grid frequency fief, and the constant virtual inertia; and uses an obtained VSG power parameter $P_{VSG}$ as the VSG power parameter. The VSG power parameter $P_{VSG1}$ is a parameter having the constant virtual inertia, where $$P_{VSG} = \left[ K_f (f_{ref} - f_{pll}) - T_{j1} \frac{df_{pll}}{dt} \right] \frac{P_N}{(N-n) f_{ref}} \tag{4}$$

$f_{ref}$ is the rated power grid frequency, $P_N$ is rated power of a string inverter, $K_f$ is a primary frequency modulation coefficient, and $T_{j1}$ is a constant inertia time constant.

In the process of performing VSG control calculation according to formula (4), a VSG power reference $P_{VSG1}$ may be obtained; and the VSG power reference $P_{VSG1}$ is limited to be within a preset range, where the range is a range [−0.2 $P_N$, 0.1 $P_N$]. By using the VSG power parameter $P_{VSG}$ obtained by dividing the VSG power reference $P_{VSG1}$ by (N–n), formula (4) may also be expressed as $P_{VSG}=P_{VSG1}/(N-n)$.

Figure 8:
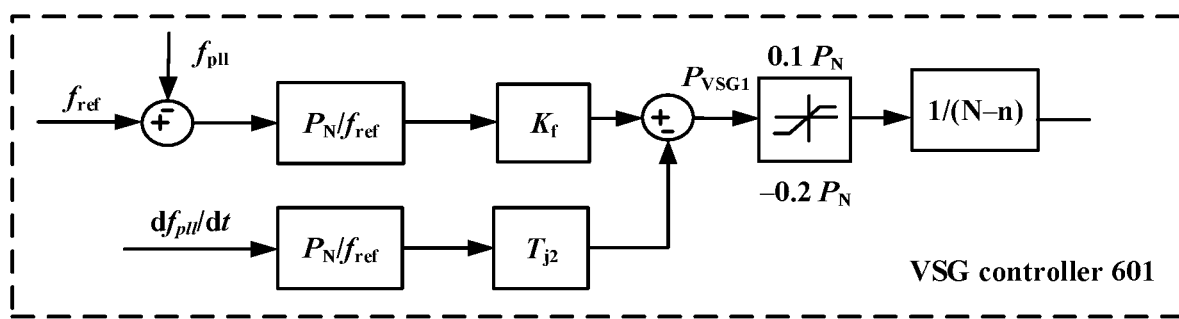
FIG. 8 is a schematic diagram of an execution principle of executing a VSG control algorithm by a VSG controller according to an embodiment of this application.

FIG. 8 is a schematic diagram of another execution principle of executing a VSG control algorithm by a VSG controller according to an embodiment of this application.

The VSG controller 601 is configured to calculate a VSG power parameter based on an actually detected current power grid frequency, a rated power grid frequency, and an adaptive zero virtual inertia by using the VSG control algorithm.

The adaptive zero virtual inertia is an adaptive zero virtual inertia time constant in the VSG control algorithm.

In an embodiment, the VSG controller 601 performs VSG control calculation according to formula (5) based on the power grid frequency $f_{pll}$ actually detected by a phase-locked loop, the rated power grid frequency fief, and the adaptive zero virtual inertia; and uses an obtained VSG power parameter $P_{VSG}$ as the VSG power parameter. The VSG power parameter $P_{VSG}$ is a parameter having the adaptive zero virtual inertia, where $$P_{VSG} = \left[K_f(f_{ref} - f_{pll}) - T_{j2}\frac{df_{pll}}{dt}\right]\frac{P_N}{(N-n)f_{ref}} \quad (5)$$

$f_{ref}$ is the rated power grid frequency, $P_N$ is rated power of a string inverter, $K_f$ is a primary frequency modulation coefficient, and $T_{j2}$ is an adaptive inertia time constant. $T_{j2}$ satisfies formula (6), where $$T_{j2} = \begin{cases} T_{J\_min} & |\Delta f| = |f_{ref} - f_{pll}| \leq B \\ T_{J\_max} & \Delta f \frac{df_{pll}}{dt} < 0 \text{ and } |\Delta f| > B \\ 0 & \Delta f \frac{df_{pll}}{dt} > 0 \text{ and } |\Delta f| > B \end{cases} \quad (6)$$

$\Delta f = f_{ref} - f_{pll}$, $T_{j\_min}$ is an allowed minimum inertia time constant, and $T_{j\_max}$ is an allowed maximum inertia time constant.

In the process of performing VSG control calculation according to formula (5), a VSG power reference $P_{VSG1}$ may be obtained; and the VSG power reference $P_{VSG1}$ is limited to be within a preset range, where the range is a range [−0.2 $P_N$, 0.1 $P_N$]. By using the VSG power parameter $P_{VSG}$ obtained by dividing the VSG power reference $P_{VSG1}$ by (N−n), formula (5) may also be expressed as $P_{VSG}=P_{VSG1}/(N-n)$.

Figure 9:
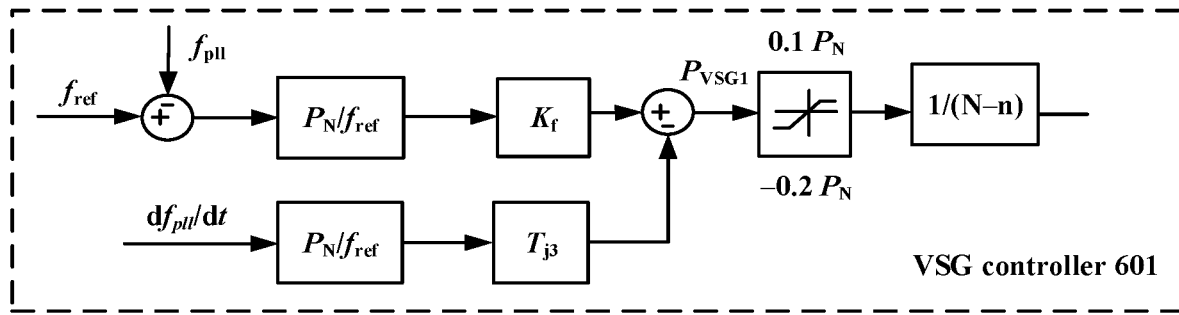
FIG. 9 is a schematic diagram of an execution principle of executing a VSG control algorithm by a VSG controller according to an embodiment of this application.

FIG. 9 is a schematic diagram of another execution principle of executing a VSG control algorithm by a VSG controller according to an embodiment of this application.

The VSG controller 601 is configured to calculate a VSG power parameter based on an actually detected current power grid frequency, a rated power grid frequency, and an adaptive negative virtual inertia by using the VSG control algorithm.

The adaptive negative virtual inertia is an adaptive negative virtual inertia time constant in the VSG control algorithm.

In an embodiment, the VSG controller 601 performs VSG control calculation according to formula (7) based on the power grid frequency $f_{pll}$ actually detected by a phase-locked loop, the rated power grid frequency $f_{ref}$, and the adaptive negative virtual inertia; and uses an obtained VSG power parameter $P_{VSG}$ as the VSG power parameter. The VSG power parameter $P_{VSG}$ is a parameter having the adaptive zero virtual inertia, where $$P_{VSG} = \left[K_f(f_{ref} - f_{pll}) - T_{j3}\frac{df_{pll}}{dt}\right]\frac{P_N}{(N-n)f_{ref}} \quad (7)$$

$f_{ref}$ is the rated power grid frequency, $P_N$ is rated power of a string inverter, $K_f$ is a primary frequency modulation coefficient, and $T_{j3}$ is an adaptive inertia time constant. $T_{j3}$ satisfies formula (8), where $$T_{j3} = \begin{cases} T_{J\_min} & |\Delta f| = |f_{ref} - f_{pll}| \leq B \\ T_{J\_max} & \Delta f \frac{df_{pll}}{dt} < 0 \text{ and } |\Delta f| > B \\ -T_{J\_max} & \Delta f \frac{df_{pll}}{dt} > 0 \text{ and } |\Delta f| > B \end{cases} \quad (8)$$

$\Delta f = f_{ref} - f_{pll}$, $T_{j\_min}$ is an allowed minimum inertia time constant, and $T_{j\_max}$ is an allowed maximum inertia time constant.

In the process of performing VSG control calculation according to formula (7), a VSG power reference $P_{VSG1}$ may be obtained; and the VSG power reference $P_{VSG1}$ is limited to be within a preset range, where the range is a range [−0.2 $P_N$, 0.1 $P_N$]. By using the VSG power parameter $P_{VSG}$ obtained by dividing the VSG power reference $P_{VSG1}$ by (N−n), formula (7) may also be expressed as $P_{VSG}=P_{VSG1}/(N-n)$.

In an embodiment of this application, based on the VSG power parameters generated in FIG. 7 to FIG. 9, there are a plurality of manners in which the MPPT controller 602 performs MPPT control on the n DC/DC converter circuits. A specific principle of generating a second control parameter by the MPPT controller 602 may be described with reference to content about generating the second control parameter by the MPPT controller 201 in FIG. 3, FIG. 4, and FIG. 5.

Figure 10:
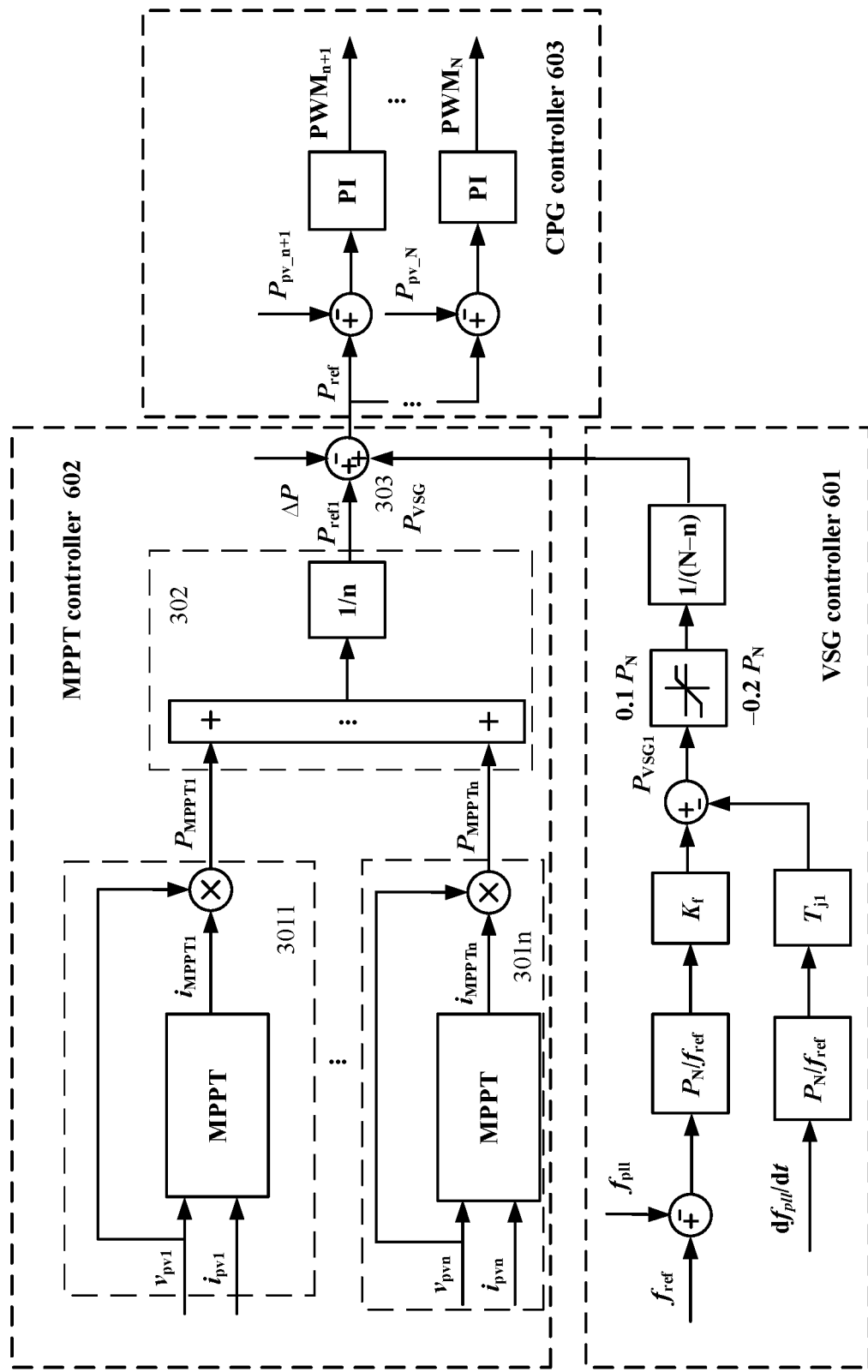
FIG. 10 is a schematic diagram of an execution principle of executing an MPPT control algorithm by an MPPT controller according to an embodiment of this application.

With reference to the embodiment as shown in FIG. 3, FIG. 10 is a schematic diagram of an execution principle of executing an MPPT control algorithm by an MPPT controller according to an embodiment of this application. The MPPT controller 602 includes a total of n control circuits, that is, a control circuit 3011 to a control circuit 301n, a first arithmetic unit 302, and a second arithmetic unit 303.

Each control circuit includes a maximum power point tracking MPPT processing unit and a multiplier.

The MPPT processing unit is configured to: detect a first input voltage and a first input current of a corresponding DC/DC converter circuit; determine current input power of the corresponding DC/DC converter circuit based on the first input voltage and the first input current; and obtain a second input current at a maximum power point of the DC/DC converter circuit by using an MPPT control algorithm.

The multiplier is connected to the MPPT processing unit, and is configured to calculate a product of the first input voltage and the second input current to obtain a maximum output active-power parameter.

The first arithmetic unit 302 connected to the n control circuits is configured to: determine a maximum output active-power parameter output by each control circuit; perform summation and averaging operations on n maximum output active-power parameters; and use an obtained maximum output active-power average value as a first control parameter.

Parameters used for performing calculation by the second arithmetic unit shown in FIG. 10 are different from the parameters used for performing calculation by the second arithmetic unit shown in FIG. 3. The second arithmetic unit 303 is configured to: determine a power parameter based on an active-power reserve parameter, the first control parameter, and a VSG power parameter; and use the power parameter as a second control parameter.

Correspondingly, a CPG controller is configured to control, based on the second control parameter, (N−n) DC/DC converter circuits to operate in a power adjustment-based constant power generation CPG mode.

The first control parameter is obtained by executing the MPPT control algorithm by the MPPT controller shown in FIG. 3 in the embodiment of this application. The VSG power parameter is obtained by executing a VSG control algorithm by the VSG controller shown in FIG. 7 to FIG. 9 in the embodiments of this application.

In an embodiment, the first control circuit and the $n^{th}$ control circuit shown in FIG. 10 are used as an example for description, and a same processing manner is also applied to other middle control circuits.

For the first control circuit, the MPPT processing unit is configured to: detect a first input voltage $v_{pv1}$ and a first input current $i_{pv1}$ of a first master-controlled DC/DC converter, and obtain an input current $i_{MPPT1}$ at a maximum power point through MPPT control; and the multiplier is configured to perform a multiplication operation on the first input voltage $v_{pv1}$ of the first master-controlled DC/DC converter and the second input current $i_{MPPT1}$ at the maximum power point, to obtain a maximum output active-power parameter $P_{MPPT1}$.

For the $n^{th}$ control circuit, the MPPT processing unit is configured to: detect a first input voltage $v_{pvn}$ and a first input current $i_{pvn}$ of the first master-controlled DC/DC converter, and obtain an input current $i_{MPPTn}$ at a maximum power point through MPPT control; and the multiplier is configured to perform a multiplication operation on the first input voltage $v_{pvn}$ of the first master-controlled DC/DC converter and the second input current $i_{MPPTn}$ at the maximum power point, to obtain a maximum output active-power parameter $P_{MPPTn}$.

The first arithmetic unit 302 is configured to: perform summation on obtained maximum output active-power parameters $P_{(MPPT1-MPPTn)}$ of n master-controlled DC/DC converters; perform an averaging operation on a value obtained through summation; and use an obtained maximum output active-power average value as an active-power reference parameter $P_{ref1}$ of (N−n) slave-controlled DC/DC converters.

The second arithmetic unit 303 is configured to: calculate the active-power reference parameter $P_{ref1}$, an active-power reserve parameter $\Delta P$, and a VSG power parameter $P_{VSG}$ according to formula (9); and use an obtained power parameter as a first control parameter $P_{ref}$, where $$P_{ref}=P_{ref1}-\Delta P+P_{VSG} \quad (9)$$

The active-power reserve parameter $\Delta P$ is an active-power reserve/limit parameter $\Delta P$.

The power parameter $P_{ref}$ calculated according to formula (9) is used as a power parameter for CPG control on the (N−n) DC/DC converter circuits.

Correspondingly, the CPG controller 603 shown in FIG. 10 is configured to control, based on the power parameter $P_{ref}$ for CPG control obtained by the MPPT processing unit, the (N−n) DC/DC converter circuits to operate in a power adjustment-based CPG (P-CPG) mode.

A PWM control signal is used as a modulation signal for driving an action of a switching transistor.

In an embodiment, the CPG controller 603 compares the obtained power parameter $P_{ref}$ with output active-power $P_{pv\_m}$ of an $m^{th}$ slave-controlled DC/DC converter, and a proportional integral PI controller obtains a PWM control signal of the $m^{th}$ slave-controlled DC/DC converter based on an obtained power comparison result, where m=n+1, n+2, . . . , N.

It should be noted that, a control manner in which the (N−n) DC/DC converter circuits are controlled to operate in a power adjustment-based CPG (P-CPG) mode may be a power control manner such as proportional integral control, direct power control, and model prediction control. Details are not described in this embodiment of this application.

A photovoltaic string inverter disclosed in this embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

Figure 11:
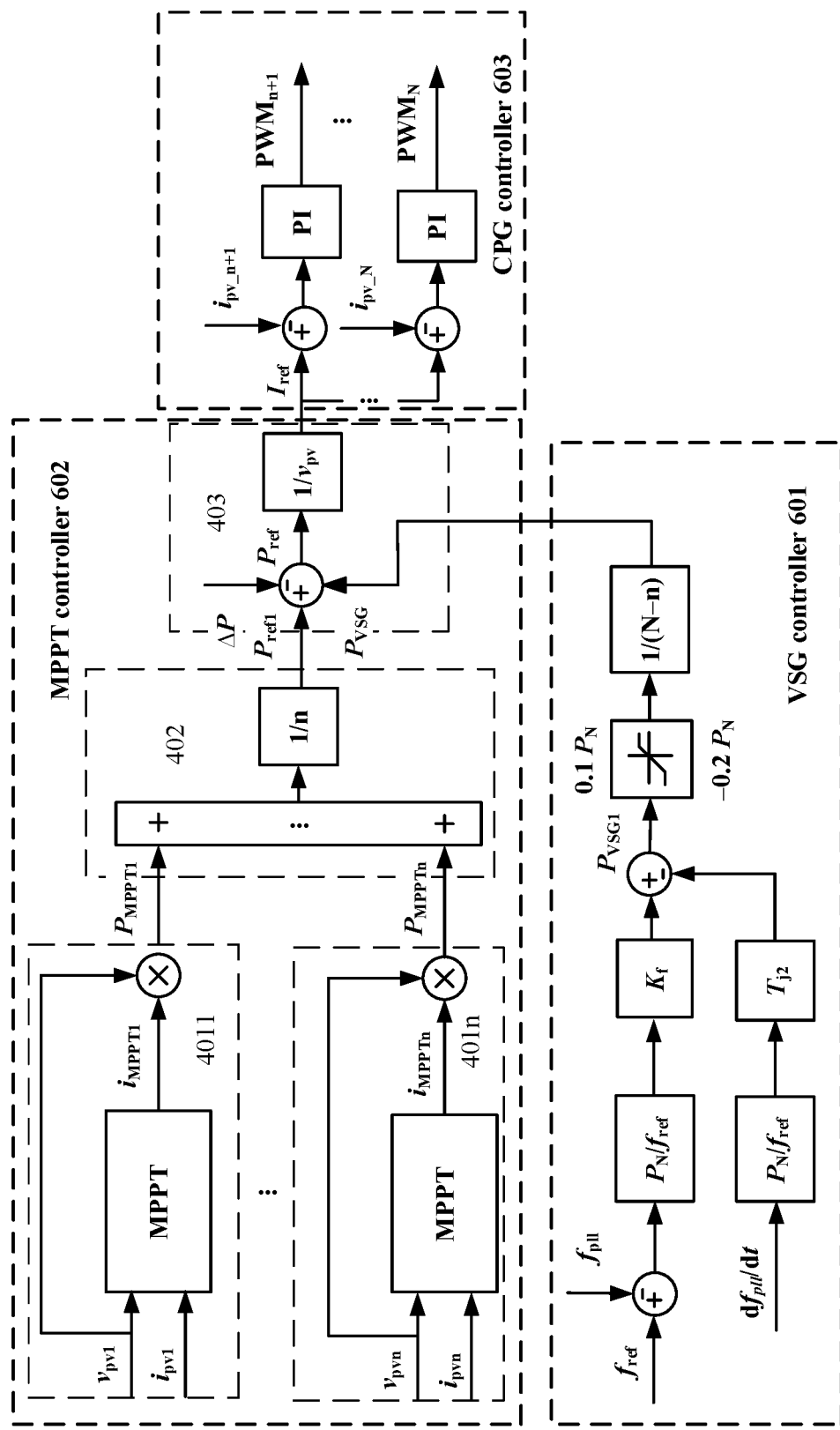
FIG. 11 is a schematic diagram of another execution principle of executing an MPPT control algorithm by an MPPT controller according to an embodiment of this application.

With reference to the embodiment as shown in FIG. 4, FIG. 11 is a schematic diagram of an execution principle of executing an MPPT control algorithm by an MPPT controller according to an embodiment of this application. The MPPT controller 602 includes a total of n control circuits, that is, a control circuit 4011 to a control circuit 401n, a first arithmetic unit 402, and a third arithmetic unit 403.

Each control circuit includes an MPPT processing unit and a multiplier.

The MPPT processing unit is configured to: detect a first input voltage and a first input current of a corresponding DC/DC converter circuit; determine current input power of the corresponding DC/DC converter circuit based on the first input voltage and the first input current; and obtain a second input current at a maximum power point of the DC/DC converter circuit by using an MPPT control algorithm.

The multiplier is connected to the MPPT processing unit, and is configured to calculate a product of the first input voltage and the second input current to obtain a maximum output active-power parameter.

The first arithmetic unit 402 connected to the n control circuits is configured to: determine a maximum output active-power parameter output by each control circuit; perform summation and averaging operations on n maximum output active-power parameters; and use an obtained maximum output active-power average value as a first control parameter.

Parameters used for performing calculation by the third arithmetic unit shown in FIG. 11 are different from the parameters used for performing calculation by the third arithmetic unit shown in FIG. 4. The third arithmetic unit 403 is configured to: determine a current parameter based on an active-power reserve parameter, the first control parameter, and a VSG power parameter; and use the current parameter as a second control parameter.

Correspondingly, a CPG controller is configured to control, based on the second control parameter, (N−n) DC/DC converter circuits to operate in a current adjustment-based constant power generation CPG mode.

The second control parameter is obtained by executing the MPPT control algorithm by the MPPT controller shown in FIG. 4 in the embodiment of this application. The VSG power parameter is obtained by executing a VSG control algorithm by the VSG controller shown in FIG. 7 to FIG. 9 in the embodiments of this application.

In an embodiment, the first control circuit and the $n^{th}$ control circuit shown in FIG. 11 are used as an example for description, and a same processing manner is also applied to other middle control circuits.

For the first control circuit, the MPPT processing unit is configured to: detect a first input voltage $v_{pv1}$ and a first input current $i_{pv1}$ of a first master-controlled DC/DC converter, and obtain an input current $i_{MPPT1}$ at a maximum power point through MPPT control; and the multiplier is configured to perform a multiplication operation on the first input voltage $v_{pv1}$ of the first master-controlled DC/DC converter and the second input current $i_{MPPT1}$ at the maximum power point, to obtain a maximum output active-power parameter $P_{MPPT1}$.

For the $n^{th}$ control circuit, the MPPT processing unit is configured to: detect a first input voltage $v_{pvn}$ and a first input current $i_{pvn}$ of the first master-controlled DC/DC converter, and obtain an input current $i_{MPPTn}$ at a maximum power point through MPPT control; and the multiplier is configured to perform a multiplication operation on the first input voltage $v_{pvn}$ of the first master-controlled DC/DC converter and the second input current $i_{MPPTn}$ at the maximum power point, to obtain a maximum output active-power parameter $P_{MPPTn}$.

The first arithmetic unit 402 is configured to: perform summation on obtained maximum output active-power $P_{(MPPT1-MPPTn)}$ of n master-controlled DC/DC converters; perform an averaging operation on a value obtained through summation; and use an obtained maximum output active-power average value as an active-power reference parameter $P_{ref1}$ of (N−n) slave-controlled DC/DC converters.

The third arithmetic unit 403 is configured to: calculate the active-power reference parameter $P_{ref1}$, an active-power reserve parameter ΔP, and a VSG power parameter $P_{VSG}$ according to formula (9); process a power parameter $P_{ref}$ according to formula (2); and use an obtained current parameter $I_{ref}$ as a first control parameter.

The current parameter $I_{ref}$ calculated according to formula (2) is used as a current instruction for CPG control on the (N−n) DC/DC converter circuits.

Correspondingly, the CPG controller 603 shown in FIG. 11 is configured to control, based on the current instruction $I_{ref}$ for CPG control obtained by the maximum power point tracking MPPT processing unit, the (N−n) DC/DC converter circuits to operate in a current adjustment-based CPG (I-CPG) mode.

A PWM control signal is used as a modulation signal for driving an action of a switching transistor.

In an embodiment, the CPG controller 202 compares the obtained current instruction $I_{ref}$ with an input current $I_{pv\_m}$ of an $m^{th}$ slave-controlled DC/DC converter, and a proportional integral PI controller obtains a PWM control signal of the $m^{th}$ slave-controlled DC/DC converter based on an obtained current comparison result, where m=n+1, n+2, . . . , N.

It should be noted that, a control manner in which the (N−n) DC/DC converter circuits are controlled to operate in a power adjustment-based CPG (P-CPG) mode may be a power control manner such as proportional integral control, direct power control, and model prediction control. Details are not described in this embodiment of this application.

A photovoltaic string inverter disclosed in this embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

Figure 12:
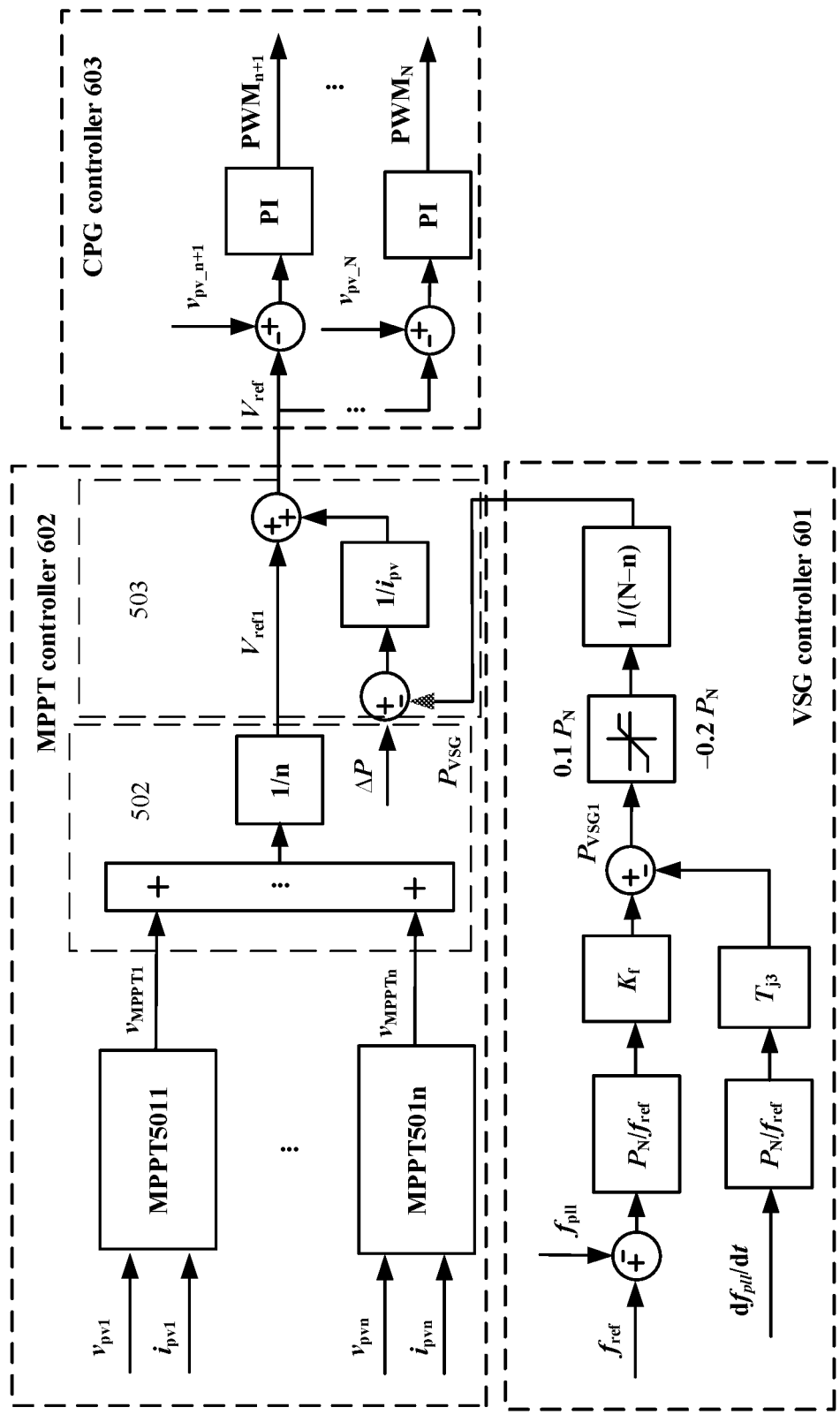
FIG. 12 is a schematic diagram of another execution principle of executing an MPPT control algorithm by an MPPT controller according to an embodiment of this application.

With reference to the embodiment as shown in FIG. 5, FIG. 12 is a schematic diagram of another execution principle of executing an MPPT control algorithm by an MPPT controller according to an embodiment of this application. The MPPT controller 602 includes a total of n MPPT processing units, that is, an MPPT processing unit 5011 to an MPPT processing unit 501n, a first arithmetic unit 502, and a fourth arithmetic unit 503.

Each control circuit includes an MPPT processing unit and a multiplier.

The MPPT processing unit is configured to: detect a first input voltage and a first input current of a corresponding DC/DC converter circuit; determine current input power of the corresponding DC/DC converter circuit based on the first input voltage and the first input current; and obtain a second input current at a maximum power point of the DC/DC converter circuit by using an MPPT control algorithm.

The multiplier is connected to the MPPT processing unit, and is configured to calculate a product of the first input voltage and the second input current to obtain maximum output active-power.

The first arithmetic unit 502 connected to the n MPPT processing units is configured to determine a second input voltage output by each MPPT processing unit; perform summation and averaging operations on n maximum output active-power; and use an obtained maximum output active-power average value as a first control parameter.

Parameters used for performing calculation by the fourth arithmetic unit shown in FIG. 12 are different from the parameters used for performing calculation by the fourth arithmetic unit shown in FIG. 5. The fourth arithmetic unit 503 is configured to: determine a voltage reference value based on an active-power reserve parameter, the first control parameter, and a VSG power parameter; determine a voltage parameter based on the voltage reference value and the first control parameter; and use the voltage parameter as a second control parameter.

A CPG controller is configured to control, based on the second control parameter, (N−n) DC/DC converter circuits to operate in a voltage adjustment-based constant power generation CPG mode.

The first control parameter is obtained by executing the MPPT control algorithm by the MPPT controller shown in FIG. 5 in the embodiment of this application. The VSG power parameter is obtained by executing a VSG control algorithm by the VSG controller shown in FIG. 7 to FIG. 9 in the embodiments of this application.

In an embodiment, the MPPT processing unit 5011 and the MPPT processing unit 501n shown in FIG. 12 are used as an example for description, and a same processing manner is also applied to other MPPT processing units.

For the MPPT processing unit 5011, the MPPT processing unit 5011 is configured to: detect a first input voltage $v_{pv1}$ and a first input current $i_{pv1}$ of a first master-controlled DC/DC converter, and obtain an input voltage $v_{MPPT1}$ at a maximum power point through MPPT control.

For the MPPT processing unit 501n, the MPPT processing unit 1201n is configured to: detect a first input voltage $v_{pvn}$ and a first input current $i_{pvn}$ of an $n^{th}$ master-controlled DC/DC converter, and obtain an input voltage $v_{MPPTn}$ at a maximum power point through MPPT control.

The first arithmetic unit 502 is configured to: perform summation on obtained input voltages $I_{(MPPT1-MPPTn)}$ of n master-controlled DC/DC converters; perform an averaging operation on a value obtained through summation; and use an obtained input voltage average value as a voltage reference $V_{ref1}$ of (N−n) slave-controlled DC/DC converters.

The fourth arithmetic unit 503 is configured to: calculate an active-power reserve parameter ΔP and a VSG power parameter $P_{VSG}$ according to formula (10), to obtain a voltage reference value; perform calculation based on the voltage reference value and the voltage reference $V_{ref1}$; and use an obtained voltage parameter as a second control parameter, where $$V_{ref} = V_{ref1} + (\Delta P - P_{VSG})/i_{pv} \quad (10)$$

The voltage parameter $V_{ref}$ calculated according to formula (10) is used as a voltage instruction for CPG control on the (N−n) DC/DC converter circuits.

Correspondingly, the CPG controller 603 shown in FIG. 12 is configured to control, based on the voltage parameter $V_{ref}$ for CPG control obtained by the MPPT processing unit, the (N−n) DC/DC converter circuits to operate in a voltage adjustment-based CPG (V-CPG) mode.

In an embodiment, the CPG controller 603 compares the obtained voltage parameter $V_{ref}$ with an input current $v_{pv\_m}$ of an $m^{th}$ slave-controlled DC/DC converter, and a proportional integral PI controller obtains a PWM control signal of the $m^{th}$ slave-controlled DC/DC converter based on an obtained voltage comparison result, where m=n+1, n+2, . . . , N.

A photovoltaic string inverter disclosed in this embodiment of this application does not need to be provided with a solar radiant intensity detection apparatus. Therefore, costs of the photovoltaic string inverter can be reduced. Moreover, master MPPT control is performed on n DC/DC converter circuits in N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

A DC/AC inverter in the photovoltaic string inverter disclosed in this embodiment of this application is optional, and may be a string three-phase inverter or a string single-phase inverter.

In the photovoltaic string inverter disclosed in an embodiment of this application, master control is performed on the n DC/DC converter circuits in the N DC/DC converter circuits located at the previous stage of the DC/AC inverter circuit, that is, MPPT control is performed, so that the n DC/DC converter circuits operate in an MPPT mode; and slave control is performed on the (N−n) DC/DC converter circuits, that is, CPG control is performed, so that the (N−n) DC/DC converter circuits operate in a CPG mode. Through master-slave control, a fast and accurate power reserve or limit of the photovoltaic string inverter with any illumination intensity and ambient temperature can be implemented, and fluctuation of the direct current bus voltage and the alternating current output power that are of the photovoltaic string inverter in the control process can be eliminated. In addition, control on the photovoltaic string inverter is improved, and the lifespan of the photovoltaic string inverter is prolonged, without a need to add an energy storage element. Further, PV-VSG control by using the active-power reserve can be implemented by using the VSG control algorithm.

An embodiment of this application further correspondingly discloses, based on the photovoltaic power system shown in the foregoing accompanying drawing, a control method for controlling the photovoltaic power system. The control method is detailed by using the following embodiments.

Figure 13:
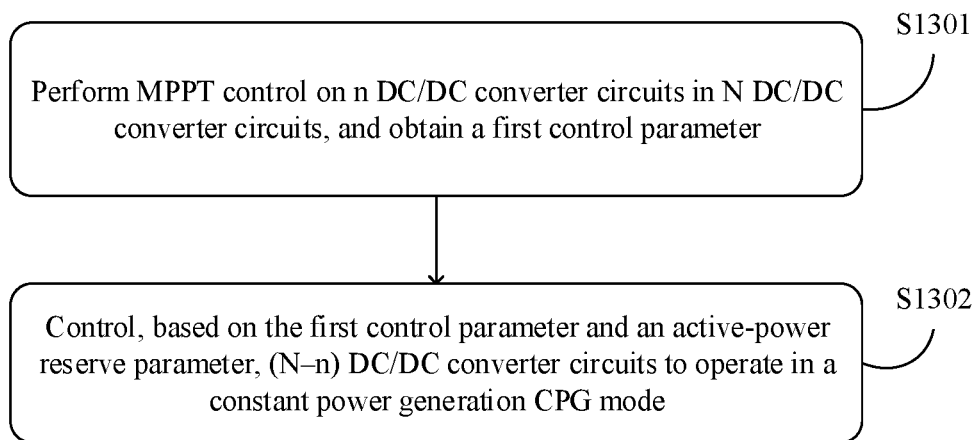
FIG. 13 is a schematic flowchart of a photovoltaic power system control method according to an embodiment of this application.

FIG. 13 is a schematic flowchart of a control method based on the photovoltaic power system shown in FIG. 1 according to an embodiment of this application. With reference to FIG. 1, the photovoltaic power system control method includes the following operations.

S1301: Perform MPPT control on n DC/DC converter circuits in N DC/DC converter circuits; and determine a first control parameter that enables the n DC/DC converter circuits to be in a maximum power point operating state.

With reference to FIG. 1, when S1301 is being performed, a controller 103 performs MPPT control on the n DC/DC converter circuits in the N DC/DC converter circuits; and determines the first control parameter that enables the n DC/DC converter circuits to be in a maximum power point operating state. For a specific execution principle, refer to the description in FIG. 1. Details are not described herein again.

S1302: Control, based on the first control parameter and an active-power reserve parameter, (N−n) DC/DC converter circuits to operate in a constant power generation CPG mode.

With reference to FIG. 1, when S1032 is being performed, the CPG controller 202 controls, based on a second control parameter, the (N−n) DC/DC converter circuits to operate in a CPG mode.

In the photovoltaic power system control method disclosed in an embodiment of this application, master control is performed on the n DC/DC converter circuits in the N DC/DC converter circuits located at a previous stage of a DC/AC inverter circuit, that is, MPPT control is performed, so that the n DC/DC converter circuits operate in an MPPT mode; and slave control is performed on the (N−n) DC/DC converter circuits, that is, CPG control is performed, so that the (N−n) DC/DC converter circuits operate in a CPG mode. In an embodiment of this application, master-slave control is implemented on the N DC/DC converter circuits located at the previous stage of the DC/AC inverter circuit, to reduce impact of illumination intensity and ambient temperature on an active-power reserve of a photovoltaic string inverter, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

Figure 14:
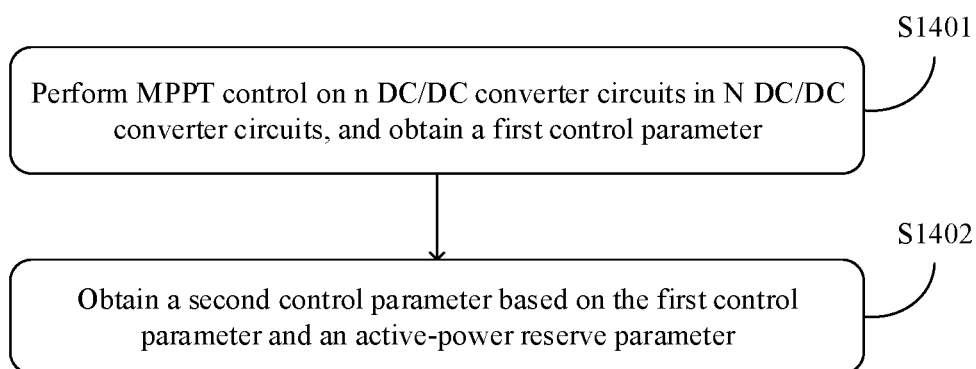
FIG. 14 is a schematic flowchart of a control method performed by a controller according to an embodiment of this application.

FIG. 14 is a schematic flowchart of a control method performed by a controller according to an embodiment of this application. With reference to FIG. 2, the method includes the following operations.

S1401: Perform MPPT control on n DC/DC converter circuits in N DC/DC converter circuits, and obtain a first control parameter.

Figure 15:
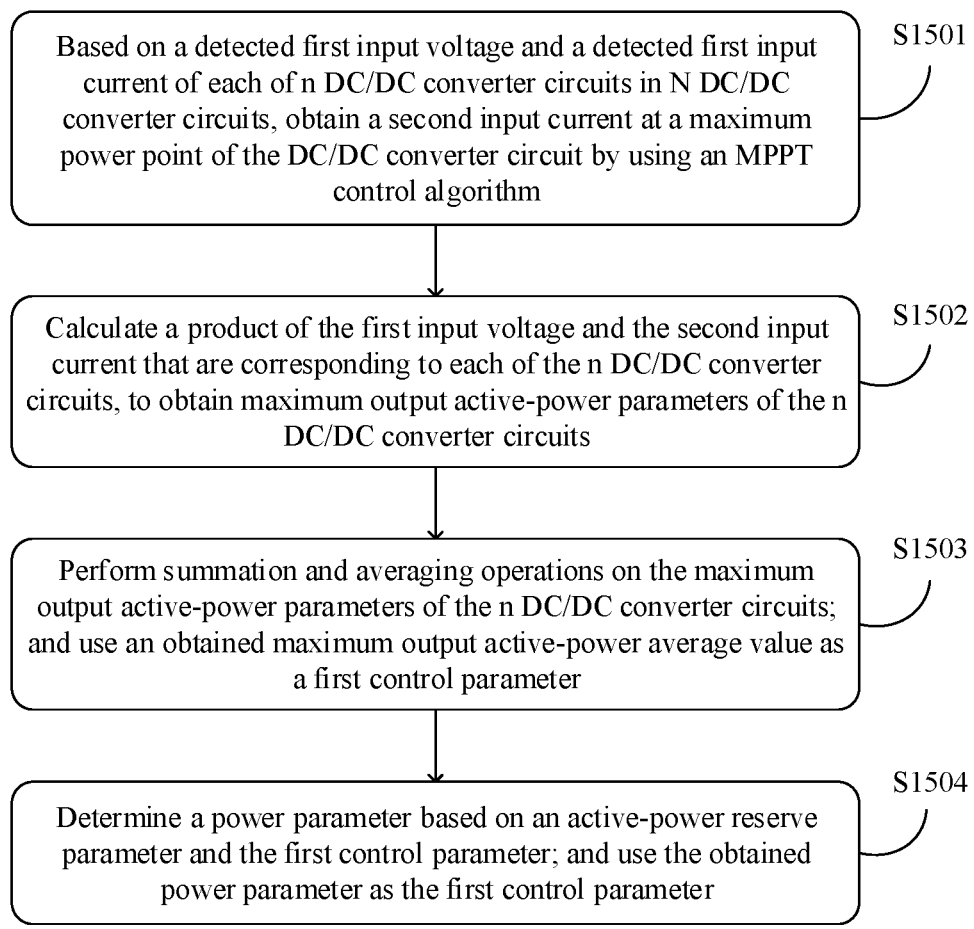
FIG. 15 is a schematic flowchart of an execution method for executing an MPPT control algorithm by an MPPT controller according to an embodiment of this application.

Optionally, as shown in FIG. 15, a specific implementation process of S1401 includes the following operations.

S1501: Detect a first input voltage and a first input current of each of the n DC/DC converter circuits in the N DC/DC converter circuits; determine current input power of the corresponding DC/DC converter circuit based on the first input voltage and the first input current; and obtain a second input current at a maximum power point of the DC/DC converter circuit by using an MPPT control algorithm.

With reference to FIG. 3, S1501 is performed by the MPPT processing unit. For a specific execution principle, refer to the corresponding description in FIG. 3. Details are not described herein again.

S1502: Calculate a product of the first input voltage and the second input current that are corresponding to each of the n DC/DC converter circuits, to obtain maximum output active-power parameters of the n DC/DC converter circuits.

With reference to FIG. 3, S1502 is performed by the multiplier. For a specific execution principle, refer to the corresponding description in FIG. 3. Details are not described herein again.

S1503: Perform summation and averaging operations on the maximum output active-power parameters of the n DC/DC converter circuits; and use an obtained maximum output active-power average value as the first control parameter.

With reference to FIG. 3, S1503 is performed by the first arithmetic unit 302. For a specific execution principle, refer to the corresponding description in FIG. 3. Details are not described herein again.

S1504: Determine a power parameter based on an active-power reserve parameter and the first control parameter; and use the power parameter as a second control parameter.

With reference to FIG. 3, S1504 is performed by the second arithmetic unit 303. For a specific execution principle, refer to the corresponding description in FIG. 3. Details are not described herein again.

S1402: Obtain the second control parameter based on the first control parameter and the active-power reserve parameter.

With reference to FIG. 2, S1402 is performed by the MPPT controller 201. For a specific execution principle, refer to the corresponding description in FIG. 2. Details are not described herein again.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

Figure 16:
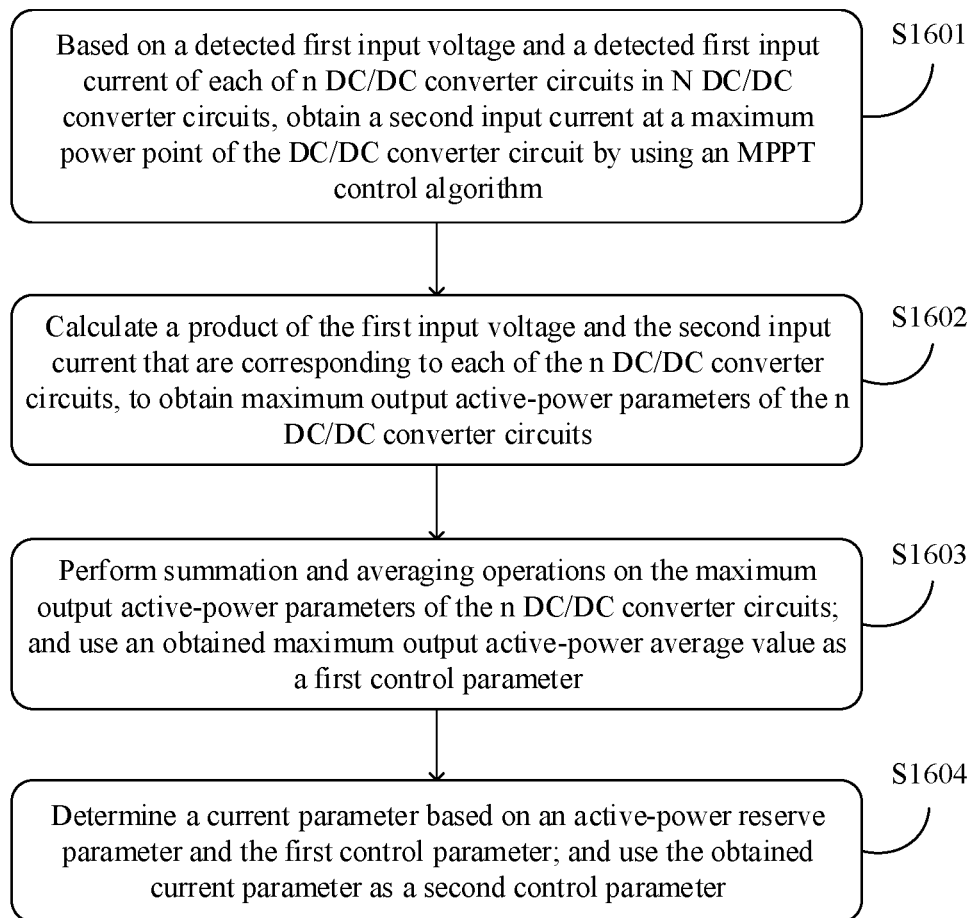
FIG. 16 is a schematic flowchart of another execution method for executing an MPPT control algorithm by an MPPT controller according to an embodiment of this application.

In an embodiment, FIG. 16 is a schematic flowchart of another execution method for executing an MPPT control algorithm by an MPPT controller that is correspondingly disclosed in an embodiment of this application based on FIG. 4. The method includes the following operations.

S1601: Detect a first input voltage and a first input current of each of n DC/DC converter circuits in N DC/DC converter circuits; determine current input power of the corresponding DC/DC converter circuit based on the first input voltage and the first input current; and obtain a second input current at a maximum power point of the DC/DC converter circuit by using an MPPT control algorithm.

With reference to FIG. 4, S1601 is performed by the MPPT processing unit. For a specific execution principle, refer to the corresponding description in FIG. 4. Details are not described herein again.

S1602: Calculate a product of the first input voltage and the second input current that are corresponding to each of the n DC/DC converter circuits, to obtain maximum output active-power parameters of the n DC/DC converter circuits.

With reference to FIG. 4, S1602 is performed by the multiplier. For a specific execution principle, refer to the corresponding description in FIG. 4. Details are not described herein again.

S1603: Perform summation and averaging operations on the maximum output active-power parameters of the n DC/DC converter circuits; and use an obtained maximum output active-power average value as a first control parameter.

With reference to FIG. 4, S1603 is performed by the first arithmetic unit 402. For a specific execution principle, refer to the corresponding description in FIG. 4. Details are not described herein again.

S1604: Determine a current parameter based on an active-power reserve parameter and the first control parameter; and use the current parameter as a second control parameter.

With reference to FIG. 4, S1604 is performed by the third arithmetic unit 403. For a specific execution principle, refer to the corresponding description in FIG. 4. Details are not described herein again.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

Figure 17:
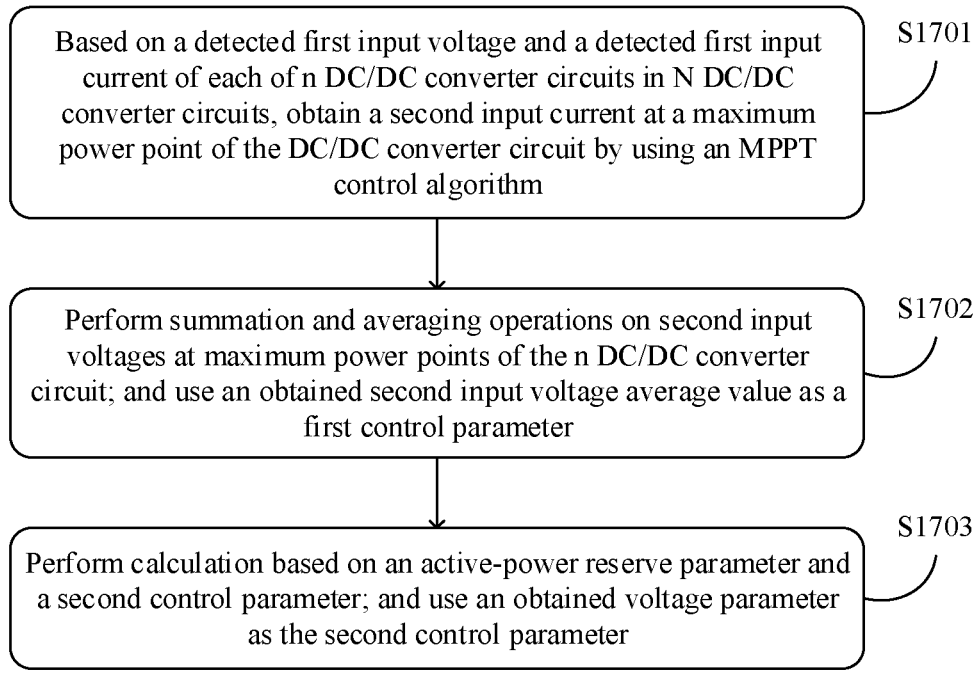
FIG. 17 is a schematic flowchart of another execution method for executing an MPPT control algorithm by an MPPT controller according to an embodiment of this application.

FIG. 17 is a schematic flowchart of another execution method for executing an MPPT control algorithm by an MPPT controller that is disclosed in an embodiment of the present invention based on FIG. 5. The method includes the following operations.

S1701: Detect a first input voltage and a first input current of each of n DC/DC converter circuits in N DC/DC converter circuits; determine current input power of the corresponding DC/DC converter circuit based on the first input voltage and the first input current; and obtain a second input voltage at a maximum power point of the DC/DC converter circuit by using an MPPT control algorithm.

With reference to FIG. 5, S1701 is performed by the MPPT processing unit. For a specific execution principle, refer to the corresponding description in FIG. 5. Details are not described herein again.

S1702: Perform summation and averaging operations on second input voltages at maximum power points of the n DC/DC converter circuits; and use an obtained second input voltage average value as a first control parameter.

With reference to FIG. 5, S1702 is performed by the first arithmetic unit 502. For a specific execution principle, refer to the corresponding description in FIG. 5. Details are not described herein again.

S1703: Perform calculation based on an active-power reserve parameter and the first control parameter; and use an obtained voltage parameter as a second control parameter.

With reference to FIG. 5, S1703 is performed by the fourth arithmetic unit 503. For a specific execution principle, refer to the corresponding description in FIG. 5. Details are not described herein again.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on (N−n) DC/DC converter circuits, to implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

As disclosed in an embodiment of this application, master MPPT control is performed on the n DC/DC converter circuits in the N DC/DC converter circuits located at the previous stage of the DC/AC inverter circuit, and slave CPG control is performed on the (N−n) DC/DC converter circuits. In this way, based on master-slave control on the N DC/DC converters located at the previous stage of the DC/AC inverter circuit, PV-VSG control by using an active-power reserve can be implemented; problems of deterioration in PV-VSG output performance and even system instability that are caused by illumination intensity and ambient temperature changes can be resolved; and an inertia support capability of a photovoltaic power system can be enhanced, and fluctuation of the direct current bus voltage and the output power that are of the string inverter in the power control process can be eliminated.

Based on the photovoltaic power system control method shown in FIG. 13, in the process in which PV-VSG control by using the active-power reserve is implemented based on master-slave control on the N DC/DC converters located at the previous stage of the DC/AC inverter circuit, there may be a plurality of control policies for providing, by a controller 103, a PWM control signal of each DC/DC converter circuit in real time according to a control policy of the DC/DC converter circuit. This embodiment of this application provides detailed descriptions by using the following embodiments.

Figure 18:
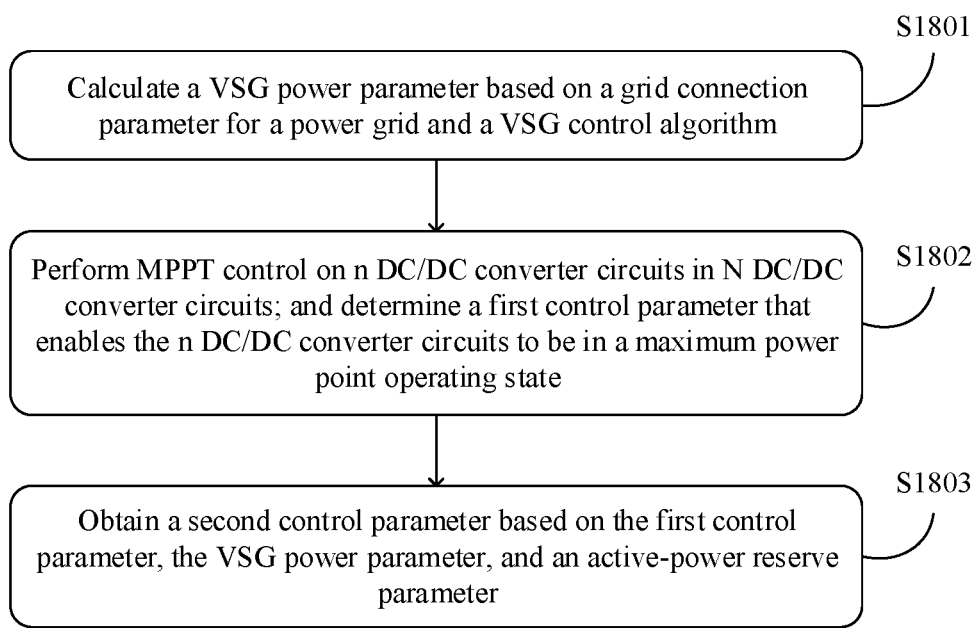
FIG. 18 is a schematic flowchart of another control method performed by controllers according to an embodiment of this application.

FIG. 18 is a schematic flowchart of another control method performed by controllers that is disclosed in an embodiment of the present invention in correspondence to FIG. 6. The method includes the following operations.

S1801: Calculate a VSG power parameter based on a grid connection parameter for a power grid and a VSG control algorithm.

With reference to FIG. 6, S1801 is performed by the VSG controller 601. For a specific execution principle, refer to the corresponding description in FIG. 6. Details are not described herein again.

S1802: Perform maximum power point tracking MPPT control on n DC/DC converter circuits in N DC/DC converter circuits; and determine a first control parameter that enables the n DC/DC converter circuits to be in a maximum power point operating state.

S1803: Obtain a second control parameter based on the first control parameter, the VSG power parameter, and an active-power reserve parameter.

With reference to FIGS. 6, S1802 and S1803 are performed by the MPPT controller 602. For a specific execution principle, refer to the corresponding description in FIG. 6. Details are not described herein again.

In an embodiment, there are a plurality of manners in which the VSG controller 601 obtains the VSG power parameter based on the power grid parameter and the VSG control algorithm. Three manners are disclosed in this embodiment of this application, but are not limited thereto.

A first manner is performing VSG control calculation based on an actually detected power grid frequency, a rated power grid frequency, and a constant virtual inertia, to obtain the VSG power parameter.

A second manner is performing VSG control calculation based on an actually detected power grid frequency, a rated power grid frequency, and an adaptive zero virtual inertia, to obtain the VSG power parameter.

A third manner is performing VSG control calculation based on an actually detected power grid frequency, a rated power grid frequency, and an adaptive negative virtual inertia, to obtain the VSG power parameter.

In an embodiment of this application, based on the VSG power parameters generated in the foregoing different manners, there are a plurality of manners in which the MPPT controller 602 performs MPPT control on the n DC/DC converter circuits. A specific principle of generating the second control parameter by the MPPT controller 602 may be described with reference to content about generating the second control parameter by the MPPT controller 201 in FIG. 15, FIG. 16, and FIG. 17.

Figure 19:
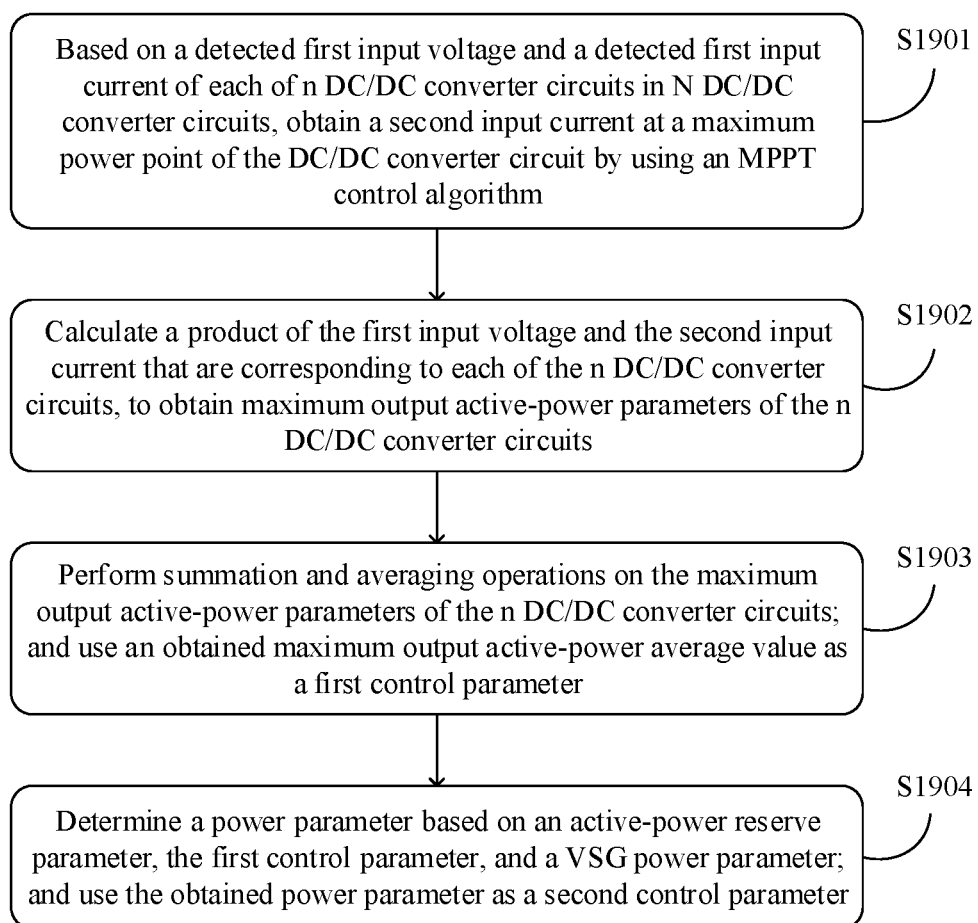
FIG. 19 is a schematic flowchart of an execution method for executing an MPPT control algorithm by an MPPT controller according to an embodiment of this application.

With reference to the embodiment as shown in FIG. 10, FIG. 19 is a schematic flowchart of an execution method for executing an MPPT control algorithm by an MPPT controller that is disclosed in an embodiment of this application in correspondence to FIG. 10. The method includes the following operations.

S1901: Detect a first input voltage and a first input current of each of n DC/DC converter circuits in N DC/DC converter circuits; determine current input power of the corresponding DC/DC converter circuit based on the first input voltage and the first input current; and obtain a second input current at a maximum power point of the DC/DC converter circuit by using an MPPT control algorithm.

With reference to FIG. 10, S1901 is performed by the MPPT processing unit. For a specific execution principle, refer to the corresponding description in FIG. 10. Details are not described herein again.

S1902: Calculate a product of the first input voltage and the second input current that are corresponding to each of the n DC/DC converter circuits, to obtain maximum output active-power parameters of the n DC/DC converter circuits.

With reference to FIG. 10, S1902 is performed by the multiplier. For a specific execution principle, refer to the corresponding description in FIG. 10. Details are not described herein again.

S1903: Perform summation and averaging operations on the maximum output active-power parameters of the n DC/DC converter circuits; and use an obtained maximum output active-power average value as a first control parameter.

With reference to FIG. 10, S1903 is performed by the first arithmetic unit 302. For a specific execution principle, refer to the corresponding description in FIG. 10. Details are not described herein again.

S1904: Determine a power parameter based on an active-power reserve parameter, the first control parameter, and a VSG power parameter; and use the power parameter as a second control parameter.

With reference to FIG. 10, S1904 is performed by the second arithmetic unit 303. For a specific execution principle, refer to the corresponding description in FIG. 10. Details are not described herein again.

Correspondingly, operation S1302 shown in FIG. 13 is specifically: Control, based on the first control parameter and the active-power reserve parameter, the (N−n) DC/DC converter circuits to operate in a power adjustment-based constant power generation CPG mode.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

Figure 20:
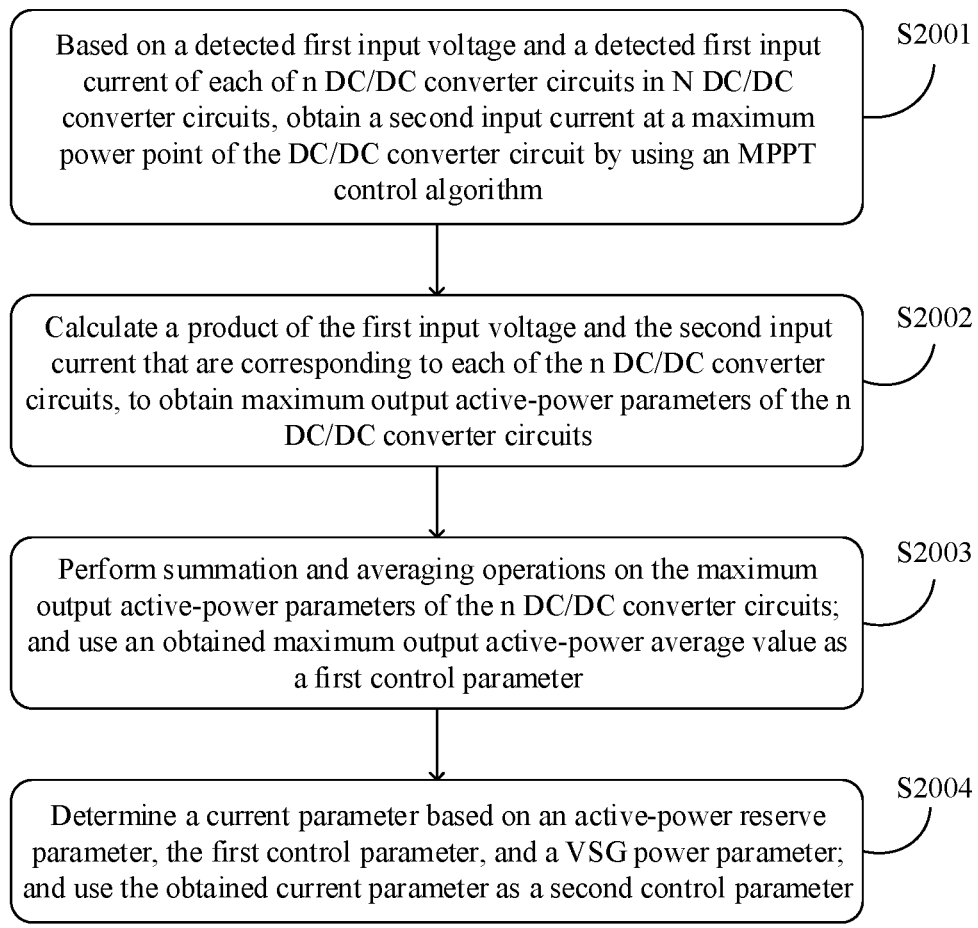
FIG. 20 is a schematic flowchart of another execution method for executing an MPPT control algorithm by an MPPT controller according to an embodiment of this application.

With reference to the embodiment as shown in FIG. 11, FIG. 20 is a schematic flowchart of another execution method for executing an MPPT control algorithm by an MPPT controller that is disclosed in an embodiment of this application in correspondence to FIG. 11. The method includes the following operations.

S2001: Detect a first input voltage and a first input current of each of n DC/DC converter circuits in N DC/DC converter circuits; determine current input power of the corresponding DC/DC converter circuit based on the first input voltage and the first input current; and obtain a second input current at a maximum power point of the DC/DC converter circuit by using an MPPT control algorithm.

With reference to FIG. 11, S2001 is performed by the MPPT processing unit. For a specific execution principle, refer to the corresponding description in FIG. 11. Details are not described herein again.

S2002: Calculate a product of the first input voltage and the second input current that are corresponding to each of the n DC/DC converter circuits, to obtain maximum output active-power parameters of the n DC/DC converter circuits.

With reference to FIG. 11, S2002 is performed by the multiplier. For a specific execution principle, refer to the corresponding description in FIG. 11. Details are not described herein again.

S2003: Perform summation and averaging operations on the maximum output active-power parameters of the n DC/DC converter circuits; and use an obtained maximum output active-power average value as a first control parameter.

With reference to FIG. 11, S2003 is performed by the first arithmetic unit 402. For a specific execution principle, refer to the corresponding description in FIG. 11. Details are not described herein again.

S2004: Determine a current parameter based on an active-power reserve parameter, the first control parameter, and a VSG power parameter; and use the current parameter as a second control parameter.

With reference to FIG. 11, S2004 is performed by the third arithmetic unit 403. For a specific execution principle, refer to the corresponding description in FIG. 11. Details are not described herein again.

Correspondingly, operation S1302 shown in FIG. 13 is specifically: Control, based on the first control parameter, the (N−n) DC/DC converter circuits to operate in a current adjustment-based constant power generation CPG mode.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. In addition, control on a virtual synchronous generator of the photovoltaic string inverter is implemented, and a lifespan of the photovoltaic string inverter is prolonged, without a need to add an energy storage element.

Figure 21:
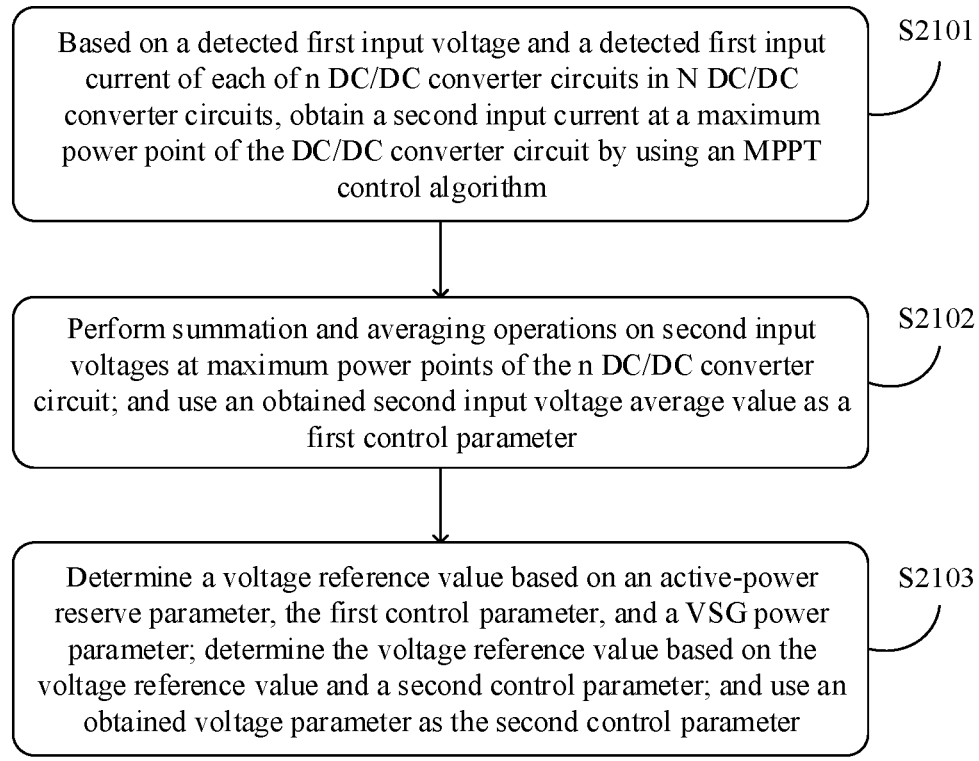
FIG. 21 is a schematic flowchart of another execution method for executing an MPPT control algorithm by an MPPT controller according to an embodiment of this application.

With reference to the embodiment as shown in FIG. 12, FIG. 21 is a schematic flowchart of another execution method for executing an MPPT control algorithm by an MPPT controller that is disclosed in an embodiment of this application in correspondence to FIG. 12. The method includes the following operations.

S2101: Detect a first input voltage and a first input current of each of n DC/DC converter circuits in N DC/DC converter circuits; determine current input power of the corresponding DC/DC converter circuit based on the first input voltage and the first input current; and obtain a second input current at a maximum power point of the DC/DC converter circuit by using an MPPT control algorithm.

With reference to FIG. 12, S2101 is performed by the MPPT processing unit. For a specific execution principle, refer to the corresponding description in FIG. 12. Details are not described herein again.

S2102: Perform summation and averaging operations on second input voltages at maximum power points of the n DC/DC converter circuits; and use an obtained second input voltage average value as a first control parameter.

With reference to FIG. 12, S2102 is performed by a second arithmetic unit 502. For a specific execution principle, refer to the corresponding description in FIG. 12. Details are not described herein again.

S2103: Determine a voltage reference value based on an active-power reserve parameter, the first control parameter, and a VSG power parameter; determine the voltage reference value based on the voltage reference value and the first control parameter; and use a voltage parameter as a second control parameter.

With reference to FIG. 12, S2103 is performed by the fourth arithmetic unit 503. For a specific execution principle, refer to the corresponding description in FIG. 12. Details are not described herein again.

Correspondingly, operation S1302 shown in FIG. 13 is specifically: Control, based on the first control parameter, the (N−n) DC/DC converter circuits to operate in a voltage adjustment-based constant power generation CPG mode.

In a photovoltaic power system control method disclosed in an embodiment of this application, no solar radiant intensity detection apparatus needs to be provided. Therefore, costs of a photovoltaic string inverter can be reduced. Moreover, master MPPT control is performed on the n DC/DC converter circuits in the N DC/DC converter circuits located at a previous stage of a DC/AC inverter circuit, and slave CPG control is performed on the (N−n) DC/DC converter circuits, to implement PV-VSG control by using an active-power reserve, implement a fast and accurate power reserve or limit of the photovoltaic string inverter with any illumination intensity and ambient temperature, and eliminate fluctuation of a direct current bus voltage and alternating current output power that are of the photovoltaic string inverter in a control process. Further, control on a virtual synchronous generator of the photovoltaic string inverter is implemented, and a lifespan of the photovoltaic string inverter is prolonged, without a need to add an energy storage element.

A specific principle and execution process of the operations performed specific to the photovoltaic string inverter disclosed in this embodiment of the present invention are the same as those of the control methods for the virtual synchronous generator of the photovoltaic string inverter disclosed in the embodiments of the present invention, and reference may be made to corresponding descriptions of the control methods for the virtual synchronous generator of the photovoltaic string inverter disclosed in the embodiments of the present invention. Details are not described herein again.

With reference to the photovoltaic power system control methods disclosed in the embodiments of this application, the photovoltaic power system control method disclosed in this embodiment of this application may be implemented directly by hardware, a processor executing program code in a memory, or a combination thereof.

Figure 22:
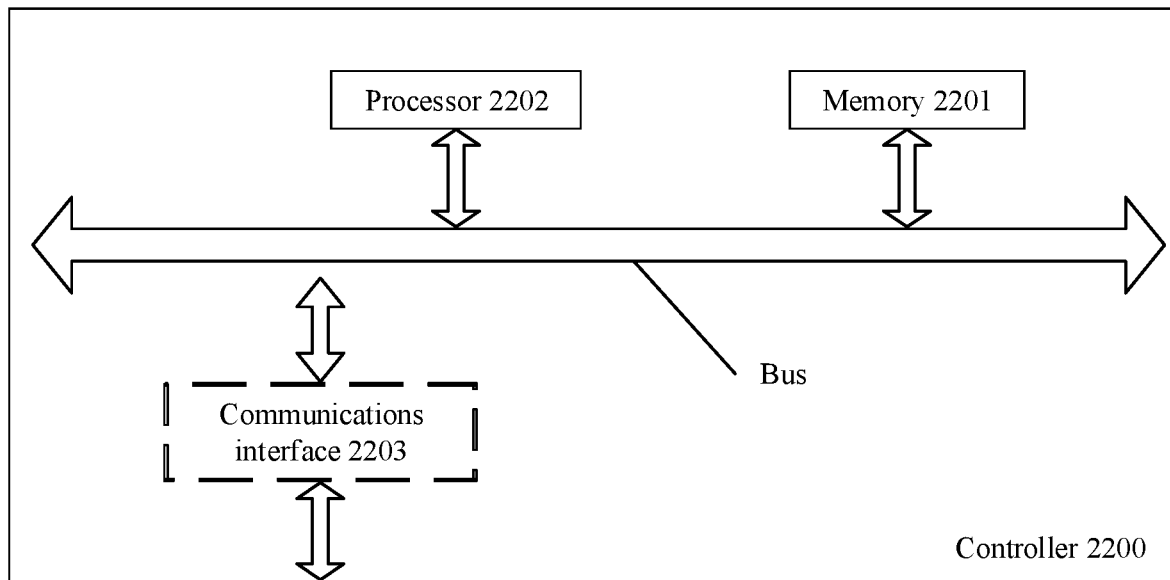
FIG. 22 is a schematic structural diagram of a controller according to an embodiment of this application.

As shown in FIG. 22, a controller 2200 includes: a memory 2201, a processor 2202 that communicates with the memory, and a communications interface 2203.

The processor 2201 is coupled to the memory 2202 through a bus, and the processor 2201 is coupled to the communications interface 2203 through the bus.

The processor 2202 may specifically be a central processing unit (CPU), a network processor (NP), an application-specific integrated circuit (ASIC), or a programmable logic device (PLD). The PLD may be a complex programmable logic device (CPLD), a field-programmable gate array (FPGA), or a generic array logic (GAL).

The memory 2201 may specifically be a content-addressable memory (CAM) or a random-access memory (RAM). The CAM may be a ternary content-addressable memory (TCAM).

The communications interface 2203 may be a wired interface, for example, a fiber distributed data interface (FDDI) or an Ethernet interface.

The memory 2201 may alternatively be integrated into the processor 2202. If the memory 2201 and the processor 2202 are independent components, the memory 2201 is connected to the processor 2202. For example, the memory 2201 may communicate with the processor 2202 through the bus. The communications interface 2203 may communicate with the processor 2202 through the bus, or the communications interface 2203 may be connected to the processor 2202 directly.

The memory 2201 is configured to store program code for controlling a photovoltaic string inverter. Optionally, the memory 2201 includes an operating system and an application program, and is configured to carry an operating program, code, or instruction used for the control methods for the virtual synchronous generator of the photovoltaic string inverter disclosed in the embodiments of this application.

When the processor 2202 or a hardware device needs to perform an operation related to the control methods for the virtual synchronous generator of the photovoltaic string inverter disclosed in the embodiments of this application, the processor 2202 or the hardware device can complete a process in which a base station in the embodiments of this application performs the corresponding control methods for the virtual synchronous generator of the photovoltaic string inverter, by invoking and executing the operating program, code, or instruction stored in the memory 2201. A specific process is: The processor 2202 invokes the program code, in the memory 2201, for controlling the photovoltaic string inverter, to perform the control methods for the virtual synchronous generator of the photovoltaic string inverter.

It can be understood that operations of a network device such as receiving/sending in the embodiments, shown in FIG. 13 to FIG. 21, corresponding to the control methods for the virtual synchronous generator of the photovoltaic string inverter may be receiving/sending processing implemented by the processor, or may be a receiving/sending process completed by a receiver/transmitter. The receiver and the transmitter may exist alone, or may be integrated into a transceiver. In a possible implementation, the base station 2200 may further include a transceiver.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

An embodiment of this application further discloses a photovoltaic power system. The photovoltaic power system includes the photovoltaic string inverter shown in FIG. 13 to FIG. 22.

In summary, in the photovoltaic power system and the control method thereof disclosed in the embodiments of this application, no solar radiant intensity detection apparatus needs to be provided. Therefore, costs of the photovoltaic string inverter can be reduced. Moreover, master MPPT control is performed on the n DC/DC converter circuits in the N DC/DC converter circuits located at the previous stage of the DC/AC inverter circuit, and slave CPG control is performed on the (N−n) DC/DC converter circuits, to implement PV-VSG control by using the active-power reserve, implement a fast and accurate power reserve or limit of the photovoltaic string inverter with any illumination intensity and ambient temperature, and eliminate fluctuation of the direct current bus voltage and the alternating current output power that are of the photovoltaic string inverter in the control process. Further, control on the virtual synchronous generator of the photovoltaic string inverter is implemented, and the lifespan of the photovoltaic string inverter is prolonged, without a need to add an energy storage element.

What is claimed is:

1. A photovoltaic power system, comprising:
   a plurality of photovoltaic strings;
   a direct current-to-alternating current (DC/AC) inverter circuit;
   N DC/DC converter circuits located at a previous stage of the DC/AC inverter circuit, wherein each DC/DC converter circuit is connected to at least one of the plurality of photovoltaic strings, and wherein N is a positive integer greater than or equal to 2; and
   a controller connected to each of the DC/AC inverter circuit and the N DC/DC converter circuits, and is configured to:
   perform a maximum power point tracking (MPPT) control on n DC/DC converter circuits,
   perform summation and averaging operations on maximum output active-power parameters of the n DC/DC converter circuits to obtain a maximum output active-power average value,
   use the maximum output active-power average value as a first control parameter, and
   control, based on the first control parameter and an active-power reserve parameter, N−n DC/DC converter circuits to operate in a constant power generation (CPG) mode, wherein n is a positive integer greater than or equal to 1 and less than or equal to N−1; and
   wherein the photovoltaic power system is connected to a power grid through an output end of the DC/AC inverter circuit.

2. The photovoltaic power system according to claim 1, wherein the controller comprises:
   an MPPT controller configured to:
   perform the MPPT control on the n DC/DC converter circuits,
   determine the first control parameter that enables the n DC/DC converter circuits to be in a maximum power point operating state, and
   obtain a second control parameter based on the first control parameter and the active-power reserve parameter; and
   a CPG controller configured to perform a CPG control on the N-n DC/DC converter circuits based on the second control parameter, wherein the N-n DC/DC converter circuits operate in the CPG mode, wherein a photovoltaic virtual synchronous generator (PV-VSG) control by using the active-power reserve parameter is implemented based on a master-slave control on the N DC/DC converters in a process, wherein the process includes a plurality of control policies for providing a pulse-width modulation (PWM) control signal of each DC/DC converter circuit in real time according to a control policy of the DC/DC converter circuit.

3. The photovoltaic power system according to claim 1, wherein the controller comprises:
   a virtual synchronous generator (VSG) controller configured to calculate a VSG power parameter based on a grid connection parameter for the power grid and a VSG control algorithm;
   an MPPT controller, configured to:
   perform the MPPT control on the n DC/DC converter circuits,
   determine the first control parameter that enables the n DC/DC converter circuits to be in a maximum power point operating state, and
   obtain a second control parameter based on the first control parameter, the VSG power parameter, and the active-power reserve parameter; and
   a CPG controller configured to perform a CPG control on the N-n DC/DC converter circuits based on the second control parameter, wherein the N-n DC/DC converter circuits operate in the CPG mode, wherein a photovoltaic virtual synchronous generator (PV-VSG) control by using the active-power reserve parameter is implemented based on a master-slave control on the N DC/DC converters located at the previous stage of the DC/AC inverter circuit in a process, wherein the process includes a plurality of control policies for providing a pulse-width modulation (PWM) control signal of each DC/DC converter circuit in real time according to a control policy of the DC/DC converter circuit.

4. The photovoltaic power system according to claim 3, wherein the VSG controller is configured to calculate the VSG power parameter based on a detected current power grid frequency, a rated power grid frequency, and one of a constant virtual inertia, an adaptive positive virtual inertia, an adaptive zero virtual inertia, and an adaptive negative virtual inertia by using the VSG control algorithm,
   wherein the constant virtual inertia is a constant virtual inertia time constant in the VSG control algorithm, the adaptive positive virtual inertia is an adaptive positive virtual inertia time constant in the VSG control algorithm, wherein the adaptive zero virtual inertia is an adaptive zero virtual inertia time constant in the VSG control algorithm, and wherein the adaptive negative virtual inertia is an adaptive negative virtual inertia time constant in the VSG control algorithm.

5. The photovoltaic power system according to claim 2, wherein the MPPT controller comprises n control circuits, a first arithmetic unit, and a second arithmetic unit;
    wherein each control circuit comprises an MPPT processing unit and a multiplier;
    wherein the MPPT processing unit is configured to:
        detect a first input voltage and a first input current of a corresponding DC/DC converter circuit,
        determine a current input power of the corresponding DC/DC converter circuit based on the first input voltage and the first input current, and
        obtain a second input current at a maximum power point of the DC/DC converter circuit using an MPPT control algorithm;
    wherein the multiplier is connected to the MPPT processing unit, and is configured to calculate a product of the first input voltage and the second input current to obtain a maximum output active-power parameter;
    wherein the first arithmetic unit connected to the n control circuits is configured to:
    determine a maximum output active-power parameter output by each control circuit,
    perform summation and averaging operations on n maximum output active-power parameters to obtain a maximum output active-power average value, and
    use the maximum output active-power average value as the first control parameter; and
    wherein the second arithmetic unit is configured to:
    determine a power parameter based on the active-power reserve parameter and the first control parameter, and
    use the power parameter as the second control parameter.

6. The photovoltaic power system according to claim 2, wherein the MPPT controller comprises n control circuits, a first arithmetic unit, and a third arithmetic unit;
    wherein each control circuit comprises an MPPT processing unit and a multiplier;
    wherein the MPPT processing unit is configured to:
        detect a first input voltage and a first input current of a corresponding DC/DC converter circuit,
        determine a current input power of the corresponding DC/DC converter circuit based on the first input voltage and the first input current, and
        obtain a second input current at a maximum power point of the DC/DC converter circuit using an MPPT control algorithm;
    wherein the multiplier is connected to the MPPT processing unit, and is configured to calculate a product of the first input voltage and the second input current to obtain a maximum output active-power parameter;
    wherein the first arithmetic unit connected to the n control circuits is configured to:
    determine a maximum output active-power parameter output by each control circuit,
    perform summation and averaging operations on n maximum output active-power parameters to obtain a maximum output active-power average value, and
    use the maximum output active-power average value as the first control parameter; and
    wherein the third arithmetic unit is configured to:
    determine a current parameter based on the active-power reserve parameter and the first control parameter, and
    use the current parameter as the second control parameter.

7. The photovoltaic power system according to claim 2, wherein the MPPT controller comprises n MPPT processing units, a first arithmetic unit, and a fourth arithmetic unit;
    wherein each MPPT processing unit is configured to:
        detect a first input voltage and a first input current of a corresponding DC/DC converter circuit,
        determine a current input power of the corresponding DC/DC converter circuit based on the first input voltage and the first input current, and
        obtain a second input voltage at a maximum power point of the DC/DC converter circuit by using an MPPT control algorithm;
    wherein the first arithmetic unit connected to the n MPPT processing units is configured to
    determine a second input voltage output by each MPPT processing unit,
    perform summation and averaging operations on n second input voltages to obtain a second input voltage average value, and
    use the second input voltage average value as the first control parameter; and
    wherein the fourth arithmetic unit is configured to:
    perform calculation based on the active-power reserve parameter and the first control parameter to obtain a voltage parameter, and
    use the voltage parameter as the second control parameter.

8. The photovoltaic power system according to claim 3, wherein the MPPT controller comprises n control circuits, a first arithmetic unit, and a second arithmetic unit;
    wherein each control circuit comprises an MPPT processing unit and a multiplier;
    wherein the MPPT processing unit is configured to:
        detect a first input voltage and a first input current of a corresponding DC/DC converter circuit,
        determine a current input power of the corresponding DC/DC converter circuit based on the first input voltage and the first input current, and
        obtain a second input current at a maximum power point of the DC/DC converter circuit by using a maximum power point tracking MPPT control algorithm; and
    wherein the multiplier is connected to the MPPT processing unit, and is configured to calculate a product of the first input voltage and the second input current to obtain a first maximum output active-power parameter;
    wherein the first arithmetic unit connected to the n control circuits is configured to:
    determine a second maximum output active-power parameter output by each control circuit,
    perform summation and averaging operations on n maximum output active-power parameters to obtain a maximum output active-power average value, and
    use the maximum output active-power average value as the first control parameter; and
    wherein the second arithmetic unit is configured to:
    determine a power parameter based on the active-power reserve parameter, the first control parameter, and the VSG power parameter, and
    use the power parameter as the second control parameter.

9. The photovoltaic power system according to claim 3, wherein the MPPT controller comprises n control circuits, a first arithmetic unit, and a third arithmetic unit;
    wherein each control circuit comprises an MPPT processing unit and a multiplier;

wherein the MPPT processing unit is configured to:
  detect a first input voltage and a first input current of a corresponding DC/DC converter circuit,
  determine a current input power of the corresponding DC/DC converter circuit based on the first input voltage and the first input current, and
  obtain a second input current at a maximum power point of the DC/DC converter circuit by using a maximum power point tracking MPPT control algorithm;
wherein the multiplier is connected to the MPPT processing unit, and is configured to calculate a product of the first input voltage and the second input current to obtain a first maximum output active-power parameter;
wherein the first arithmetic unit connected to the n control circuits is configured to:
  determine a second maximum output active-power parameter output by each control circuit,
  perform summation and averaging operations on n maximum output active-power parameters to obtain a maximum output active-power average value, and use the maximum output active-power average value as the first control parameter; and
  wherein the third arithmetic unit is configured to:
  determine a current parameter based on the active-power reserve parameter, the first control parameter, and the VSG power parameter, and
  use the current parameter as the second control parameter.

10. The photovoltaic power system according to claim 1, wherein the DC/AC inverter circuit comprises a string three-phase inverter or a string single-phase inverter.

11. A method for controlling a photovoltaic power system, the method comprising:
  performing a maximum power point tracking (MPPT) control on n DC/DC converter circuits in the photovoltaic power system that comprises a plurality of photovoltaic strings, a controller, a direct current-to-alternating current (DC/AC) inverter circuit, and N DC/DC converter circuits located at a previous stage of the DC/AC inverter circuit, wherein each DC/DC converter circuit is connected to at least one of the plurality of photovoltaic strings, wherein N is a positive integer greater than or equal to 2, wherein the DC/AC inverter circuit is connected to the N DC/DC converter circuits and the controller, and wherein the photovoltaic power system is connected to a power grid through an output end of the DC/AC inverter circuit;
  performing summation and averaging operations on maximum output active-power parameters of the n DC/DC converter circuits to obtain a maximum output active-power average value;
  using the maximum output active-power average value as a first control parameter; and
  controlling, based on the first control parameter and an active-power reserve parameter, N−n DC/DC converter circuits to operate in a constant power generation (CPG) mode, wherein n is a positive integer greater than or equal to 1 and less than or equal to N−1.

12. The method according to claim 11, wherein the controlling of the N−n DC/DC converter circuits to operate in the CPG mode comprises:
  obtaining a second control parameter based on the first control parameter and the active-power reserve parameter; and
  controlling, based on the second control parameter, the N-n DC/DC converter circuits to operate in the CPG mode.

13. The method according to claim 11, wherein the controlling of the N-n DC/DC converter circuits to operate in the CPG mode comprises:
  obtaining a virtual synchronous generator (VSG) power parameter based on a grid connection parameter for the power grid and a VSG control algorithm;
  obtaining a second control parameter based on the first control parameter, the VSG power parameter, and the active-power reserve parameter; and
  controlling, based on the second control parameter, the N-n DC/DC converter circuits to operate in the CPG mode.

14. The method according to claim 13, wherein the obtaining of the VSG power parameter based on the grid connection parameter for the power grid and the VSG control algorithm comprises:
  calculating the VSG power parameter based on a detected current power grid frequency, a rated power grid frequency, and one of a constant virtual inertia, an adaptive positive virtual inertia, an adaptive zero virtual inertia, and an adaptive negative virtual inertia using the VSG control algorithm,
  wherein the constant virtual inertia is a constant virtual inertia time constant in the VSG control algorithm, wherein the adaptive positive virtual inertia is an adaptive positive virtual inertia time constant in the VSG control algorithm, wherein the adaptive zero virtual inertia is an adaptive zero virtual inertia time constant in the VSG control algorithm, and wherein the adaptive negative virtual inertia is an adaptive negative virtual inertia time constant in the VSG control algorithm.

15. A controller, comprising:
  a processor; and
  a memory coupled to the processor and storing instructions, which when executed by the processor, cause the processor to perform operations of controlling a photovoltaic power system, wherein the photovoltaic power system comprises a plurality of photovoltaic strings, a controller, a direct current-to-alternating current (DC/AC) inverter circuit, and N DC/DC converter circuits located at a previous stage of the DC/AC inverter circuit, wherein each DC/DC converter circuit is connected to at least one of the plurality of photovoltaic strings, wherein N is a positive integer greater than or equal to 2, wherein the DC/AC inverter circuit is connected to the N DC/DC converter circuits and the controller, and wherein the photovoltaic power system is connected to a power grid through an output end of the DC/AC inverter circuit, the operations comprising:
  performing a maximum power point tracking (MPPT) control on n DC/DC converter circuits;
  performing summation and averaging operations on maximum output active-power parameters of the n DC/DC converter circuits to obtain a maximum output active-power average value;
  using the maximum output active-power average value as a first control parameter; and
  controlling, based on the first control parameter and an active-power reserve parameter, N−n DC/DC converter circuits to operate in a constant power generation (CPG) mode, wherein n is a positive integer greater than or equal to 1 and less than or equal to N−1.

16. The controller according to claim 15, wherein the controlling of the N–n DC/DC converter circuits to operate in the CPG mode comprises:
  obtaining a second control parameter based on the first control parameter and the active-power reserve parameter; and
  controlling, based on the second control parameter, the N–n DC/DC converter circuits to operate in the CPG mode.

17. The controller according to claim 15, wherein the controlling of the N–n DC/DC converter circuits to operate in the CPG mode comprises:
  obtaining a virtual synchronous generator (VSG) power parameter based on a grid connection parameter for a power grid and a VSG control algorithm;
  obtaining a second control parameter based on the first control parameter, the VSG power parameter, and the active-power reserve parameter; and
  controlling, based on the second control parameter, the N–n DC/DC converter circuits to operate in the CPG mode.

18. The controller according to claim 17, wherein the obtaining of the VSG power parameter based on the grid connection parameter for the power grid and the VSG control algorithm comprises:
  calculating the VSG power parameter based on a detected current power grid frequency, a rated power grid frequency, and one of a constant virtual inertia, an adaptive positive virtual inertia, an adaptive zero virtual inertia, and an adaptive negative virtual inertia using the VSG control algorithm, wherein
  wherein the constant virtual inertia is a constant virtual inertia time constant in the VSG control algorithm, wherein the adaptive positive virtual inertia is an adaptive positive virtual inertia time constant in the VSG control algorithm, wherein the adaptive zero virtual inertia is an adaptive zero virtual inertia time constant in the VSG control algorithm, and wherein the adaptive negative virtual inertia is an adaptive negative virtual inertia time constant in the VSG control algorithm.

* * * * *